(12) United States Patent (10) Patent No.: US 12,617,656 B2

Miyata et al. (45) Date of Patent: May 5, 2026

(54) CRANE CONTROL SYSTEM AND CONTROL METHOD

(71) Applicant: MITSUI E&S MACHINERY CO., LTD., Tokyo (JP)

(72) Inventors: Junya Miyata, Oita (JP); Kouji Oka; Kinya Ichimura, Tokyo (JP)

(73) Assignee: Mitsui E&S Co., Ltd., Tokyo (JP)

( * ) Notice: Subject to any disclaimer, the term of this patent is extended or adjusted under 35 U.S.C. 154(b) by 1087 days.

(21) Appl. No.: 17/418,554

(22) PCT Filed: Dec. 10, 2019

(86) PCT No.: PCT/JP2019/048276

§ 371 (c)(1),
(2) Date: Jun. 25, 2021

(87) PCT Pub. No.: WO2020/137520

PCT Pub. Date: Jul. 2, 2020

(65) Prior Publication Data

US 2022/0073320 A1     Mar. 10, 2022

(30) Foreign Application Priority Data

Dec. 28, 2018     (JP) ................................. 2018-247465
Jul. 31, 2019     (JP) ................................. 2019-141500

(51) Int. Cl.

| | |
|---|---|
| *B66C 13/22* | (2006.01) |
| *B60W 30/10* | (2006.01) |
| *B66C 13/08* | (2006.01) |

(52) U.S. Cl.

CPC ............. *B66C 13/22* (2013.01); *B60W 30/10* (2013.01); *B66C 13/085* (2013.01); *B66C 2700/08* (2013.01)

(58) Field of Classification Search

CPC ... B66C 13/22; B66C 13/085; B66C 2700/08; B66C 13/12; B66C 13/48; B66C 19/007; B66C 13/46; G01S 19/14

(Continued)

(56) References Cited

U.S. PATENT DOCUMENTS

| | | | |
|---|---|---|---|
| 6,880,712 B2 | 4/2005 | Uchida et al. | |
| 7,032,763 B1 * | 4/2006 | Zakula, Sr. ........... | B66C 19/007 |
| | | | 701/44 |

(Continued)

FOREIGN PATENT DOCUMENTS

| | | |
|---|---|---|
| JP | H11-147688 A | 6/1999 |
| JP | 2002-104770 A | 4/2002 |

(Continued)

*Primary Examiner* — Minnah L Seoh

(74) *Attorney, Agent, or Firm* — Carrier, Shende & Associates P.C.; Joseph P. Carrier; Jeffrey T. Gedeon

(57) ABSTRACT

Provided are a crane control system and control method for precisely and quickly positioning a crane at a target position. A control system that includes: a position acquisition unit that successively acquires a current position of a gantry crane; and a travel control unit that is connected to each of a pair of travel devices includes a target line that extends in an X direction in plan view and is bent in a Y direction in accordance with an inclination in the Y direction in a state where the traveling gantry crane is inclined, and the travel control unit carries out a control of making the gantry crane travel by adjusting respective travel speeds of the pair of travel devices, based on a travel deviation $\Delta Dt$ between the target line and the current position of the gantry crane acquired by the position acquisition unit.

16 Claims, 24 Drawing Sheets

(58) Field of Classification Search
 USPC ........................................................... 701/50
 See application file for complete search history.

(56) References Cited

U.S. PATENT DOCUMENTS

| | | | | |
|---|---|---|---|---|
| 2002/0191813 A1* | 12/2002 | Uchida | ................... | B66C 13/46 |
| | | | | 382/104 |
| 2005/0242052 A1* | 11/2005 | O'Connor | ............. | B66C 19/007 |
| | | | | 212/344 |
| 2016/0137464 A1* | 5/2016 | Ojapalo | ................ | B66C 19/007 |
| | | | | 212/197 |
| 2017/0015532 A1* | 1/2017 | Ojapalo | .................. | B66C 13/16 |
| 2017/0269591 A1* | 9/2017 | Tanaka | ................. | G05D 1/0214 |
| 2018/0086607 A1* | 3/2018 | Ishii | ........................... | B66C 9/12 |
| 2019/0002251 A1* | 1/2019 | Resch | ................... | B66C 19/007 |

FOREIGN PATENT DOCUMENTS

| | | | | |
|---|---|---|---|---|
| JP | 2003-034490 A | | 2/2003 |
| JP | 2003-146580 A | | 5/2003 |
| JP | 2003155191 A | * | 5/2003 |
| JP | 2003261284 A | * | 9/2003 |
| JP | 2004-284699 A | | 10/2004 |
| JP | 2005-067753 A | | 3/2005 |

* cited by examiner

Figure 24:
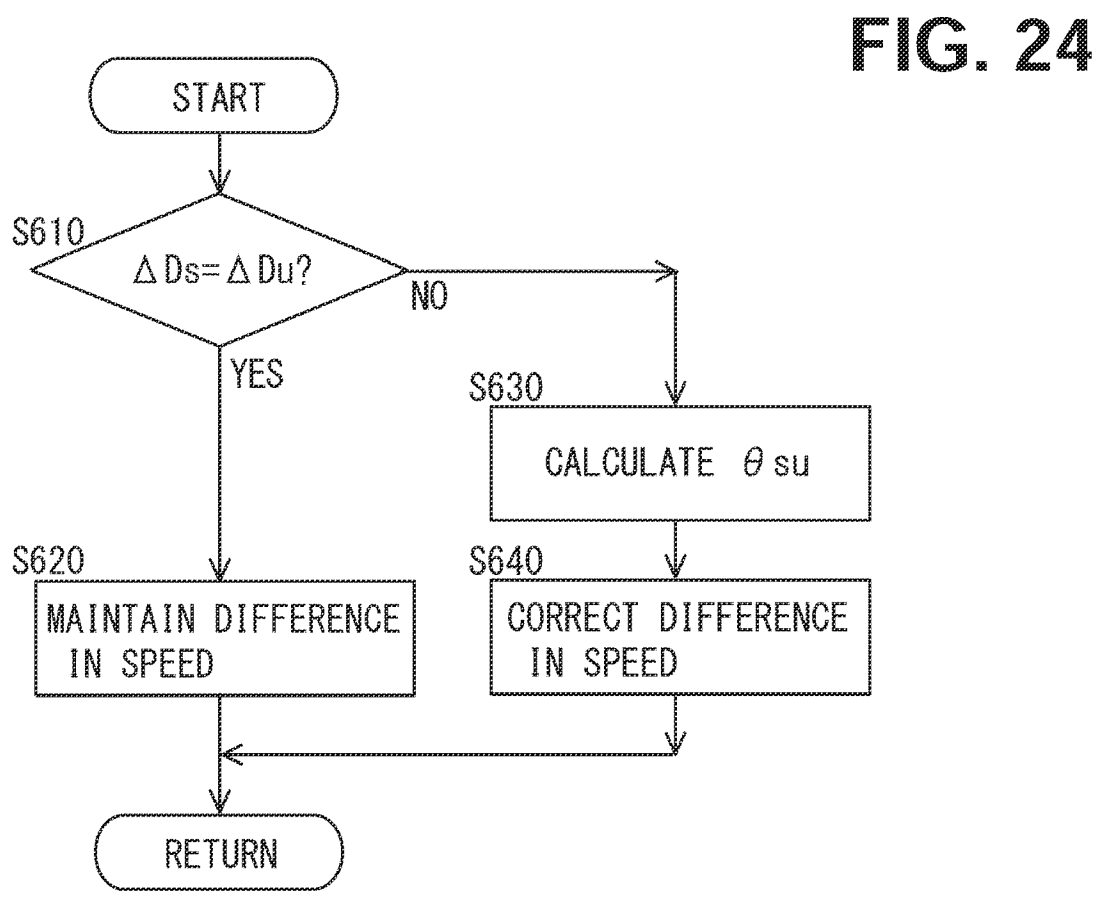

START

S610   $\Delta Ds = \Delta Du$?

NO → S630   CALCULATE $\theta$su → S640   CORRECT DIFFERENCE IN SPEED

YES → S620   MAINTAIN DIFFERENCE IN SPEED

RETURN

CRANE CONTROL SYSTEM AND CONTROL METHOD

TECHNICAL FIELD

The present disclosure relates to a crane control system and control method.

BACKGROUND ART

In the travel control on cranes used in a container yard, a device that makes a crane travel based on a deviation between the current position of the crane and a straight target line that forms a straight line in plan view with reference to the road surface of the container yard has been proposed (see for example Patent Document 1). The current position of a crane in this device is successively acquired at a certain cycle by a device that is installed in the structure of the crane and utilizes the global navigation satellite system.

PRIOR ART DOCUMENT

Patent Document

Patent Document 1: Japanese patent application Kokai publication No. 2004-284699

SUMMARY OF THE INVENTION

Problem to be Solved by the Invention

Meanwhile, the container yard is provided with drainage slopes that are different among storage lanes or bays of storage lanes, and the crane, which is a steel structure, is inclined relative to the road surface due to the drainage slopes. If a current position that is acquired by an antenna of the global navigation satellite system installed in an upper portion of the structure in a state where the crane is inclined is aligned with a straight target line, the positions of the lower portion of the structure and the travel devices of the crane are displaced and separated from the straight target line. For this reason, there is a problem that it is necessary to correct the displacements and positioning requires an extra time.

Regarding this problem, the crane described in Patent Document 1 converts a current position acquired by the device into a value with reference to the road surface on which a straight target line is present in consideration of an inclination of the crane, and controls the travel of the crane based on a deviation between the straight target line and the converted value to thus eliminate the effect of the deviation due to the inclination.

However, the crane described in Patent Document 1 uses an approach that calculates a value with reference to the road surface in consideration of the inclination of the crane every time the current position of the crane is acquired. For this reason, the calculation is conducted cyclically, so that the frequency of the calculation is high. When the frequency of calculation increases in travel control on the crane in this way, the load on the calculation process increases and also the probability of causing calculation errors increases. That is, a high frequency of calculation is a factor inhibiting precise and high-speed positioning of a crane.

An object of the present disclosure is to provide a crane control system and control method for precisely and quickly positioning a crane at a target position.

Means for Solving the Problem

A crane control system of the present invention for achieving the above-described object is a crane control system including: a position acquisition unit that successively acquires a current position of a crane having a pair of travel devices that are arranged away from each other in a direction of extension of a girder member arranged in an upper portion of a structure and are attached to a lower end of the structure; and a travel control unit that is connected to the position acquisition unit and each of the pair of travel devices, characterized in that the crane control system includes a target line that extends in a direction of travel of the crane in plan view and is bent in the direction of extension in accordance with an inclination in the direction of extension among inclinations of the crane in a state where the crane during travel is inclined, and the travel control unit carries out a control of making the crane travel by adjusting respective travel speeds of the pair of travel devices based on a deviation between the target line and the current position acquired by the position acquisition unit.

A crane control method of the present invention for achieving the above-described object is a crane control method including: successively acquiring a current position of a crane having a pair of travel devices that are arranged away from each other in a direction of extension of a girder member arranged in an upper portion of a structure and are attached to a lower end of the structure; and making the crane travel by adjusting respective travel speeds of the pair of travel devices based on the acquired current position, characterized in that the crane control method comprises: setting a target line that extends in a direction of travel of the crane in plan view and is bent in the direction of extension in accordance with an inclination in the direction of extension among inclinations of the crane in a case where the crane during travel is inclined, before the travel of the crane; and making the crane travel by adjusting respective travel speeds of the pair of travel devices based on a deviation between the set target line and the acquired current position during travel of the crane.

Effects of the Invention

The present invention enables a precise and high-speed control of making a crane travel, making it possible to precisely and quickly position a crane at a target position.

BRIEF DESCRIPTION OF THE DRAWINGS

FIG. 1 is a plan view of a container terminal in which cranes equipped with a first embodiment of a control system travel.

FIG. 6 is a block diagram illustrating a second embodiment of the control system.

FIG. 15 is an explanatory diagram illustrating a result of measurement of the correction position acquisition device of FIG. 14.

FIG. 24 is another flowchart illustrating the sixth embodiment of the crane control method.

MODES FOR CARRYING OUT THE INVENTION

Figure 2:
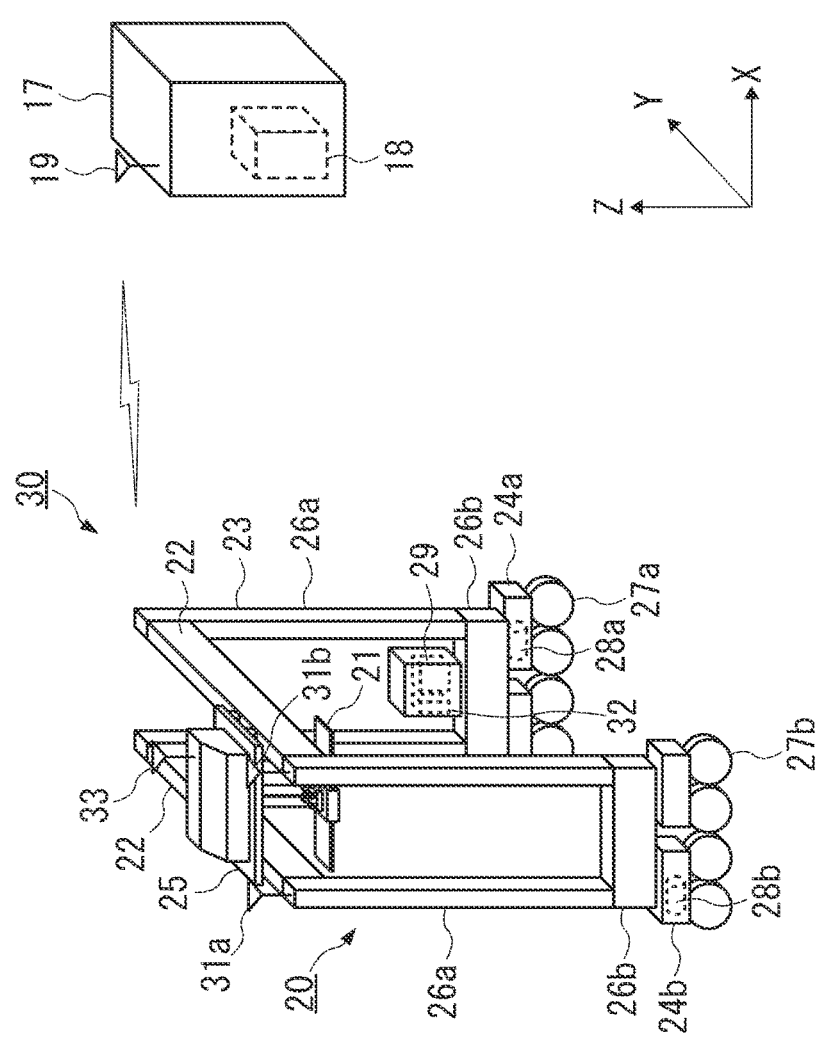
FIG. 2 is a perspective view illustrating the crane of FIG. 1.

Hereinafter, embodiments of a crane control system and control method will be described. In the drawings, the X direction is the longitudinal direction of a storage lane 13, the Y direction is the short-side direction of the storage lane 13, and the Z direction is the vertical direction. Note that in the embodiments, "t" and "u" used in reference numerals are assumed to refer to cycles. In the present disclosure, the "straight line" indicates a line having a curvature of zero in plan view (which however includes a case that can be deemed as an error), and the "curve" is a line other than a straight line and indicates a line having a curvature of greater than zero in plan view to be bent or curved, so that the "straight line" and the "curve" are assumed to be distinguished as different lines. That is, in the present disclosure, the "polygonal line" is defined as a curve that is formed by connecting a number of line segments at their ends.

Figure 1:
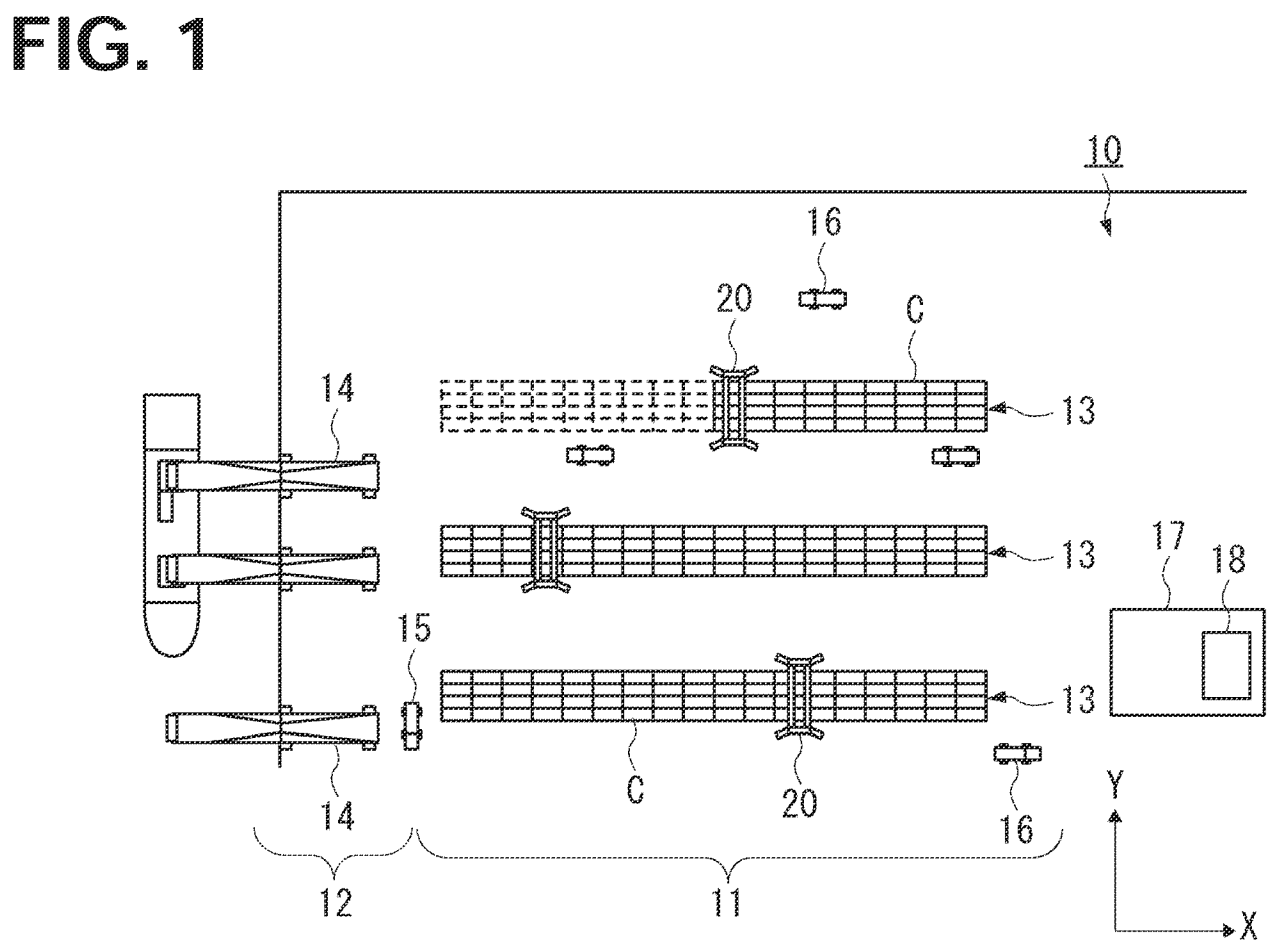

As illustrated in FIG. 1 to FIG. 4, a control system 30 of the first embodiment is a system that carries out a control of making gantry cranes 20 that handle containers C in a container terminal 10 travel based on target lines 40.

As illustrated in FIG. 1, the container terminal 10 is zoned into a container storage yard 11 and a stevedoring area 12, which are adjacent in the X direction. The container storage yard 11 includes a plurality of plurality of storage lanes 13 in which a large number of containers C are stored. The storage lanes 13 extend in the X direction (the direction from the quay toward ships in the embodiments), and are arranged such that the longitudinal directions thereof are aligned with the X direction. The stevedoring area 12 includes a plurality of quay cranes 14 that travel on rails laid along the quay. The storage lanes 13 may be arranged such that the longitudinal directions thereof are aligned with the Y direction.

In the container terminal 10, compound chassis 15, which carry the containers C between the container storage yard 11 and the stevedoring area 12, and intersectional chassis 16, which carry the containers C between the container storage yard 11 and the outside, travel. In addition, in the container terminal 10, a plurality of gantry cranes 20 travel in the X direction along the storage lanes 13 while straddling the storage lane 13 in the Y direction.

In the container terminal 10, an administration building 17 is installed. In the administration building 17, an upper system 18 and a communication instrument 19 are installed such that instructions for cargo handling operations, and the like, are made from the upper system 18 to cargo-handling devices (14 to 16, 20) through the communication instrument 19.

The container terminal 10 may be, for example, an automated terminal in which cargo-handling devices are capable of automatically handling cargos in accordance with instructions from the upper system 18, a terminal in which a remote-operation controller and the like are installed in the administration building 17 to be capable of remotely operating the cargo-handling devices, and the like. In addition, the container terminal 10 may also be, for example, a terminal in which drivers get on and directly operate the cargo-handling devices.

As illustrated in FIG. 2, each gantry crane 20 includes a hoisting accessory 21, girder members 22, a structure 23, and a pair of travel devices 24a, 24b. The hoisting accessory 21 is a device that is capable of moving up and down in the Z direction by means of a wire hanged down from a trolley 25, which is capable of moving sideways in the Y direction along the girder members 22. The girder members 22 are members that hang and support the hoisting accessory 21 through the trolley 25 and extend in the Y direction. The structure 23 is a member that supports the girder members 22 in the upper side. In addition, the structure 23 has the trolley 25 and leg members 26a, 26b, and has a substantially rectangular shape in which the longitudinal direction is aligned with the Y direction and the short-side direction is aligned with the X direction in plan view. The leg members have four legs 26a that extend in the Z direction and two horizontal beams 26b that couple the lower ends of the legs 26a adjacent in the X direction. Note that the upper ends of the legs 26a adjacent in the Y direction are coupled by the girder members 22. The pair of travel devices 24a, 24b are devices that are arranged away from each other in the direction of extension of the girder member 22 (Y direction) in plan view and attached to the lower end of the structure 23.

The pair of travel devices 24a, 24b are each arranged at the lower end of the horizontal beam 26b and have tires 27a, 27b and electric motors 28a, 28b, and the electric motors 28a, 28b are electrically connected to an inverter 29 installed in one of the horizontal beams 26b. The tires 27a, 27b may be, for example, rubber tires. The electric motors (rotating machines) 28a, 28b are devices that are provided correspondingly respectively to the pair of travel devices 24a, 24b and coupled to the corresponding tires 27a, 27b. The electric motors 28a, 28b are assumed to include reducers. The inverter 29 is a device that adjusts the rotation speed or rotation torque of the electric motors 28a, 28b. Note that there is a case where the travel devices 24a, 24b include non-drive wheels that are not coupled to the electric motors 28a, 28b in addition to the tires 27a, 27b, which are drive wheels. In addition, each of the travel devices 24a, 24b may include a plurality of electric motors.

The pair of travel devices 24a, 24b are right and left pair and arranged away from each other at the opposite ends of the structure 23 in the Y direction in plan view. The pair of travel devices 24a, 24b are devices in which the right and left electric motors 28a, 28b are independently driven by the inverter 29 to independently drive the corresponding right and left tires 27a, 27b. The rotations of the corresponding tires 27a, 27b make the gantry crane 20 travel in the X direction, which is the short-side direction of the structure 23 and is the direction of extension of the storage lane 13. More specifically, when the rotation speeds or rotation torques of the electric motors 28a, 28b are equal, the travel speeds of the pair of travel devices 24a, 24b are equal, so that the gantry crane 20 travels straight without changing the direction. On the other hand, in a case where the rotation speeds or rotation torques of the electric motors 28a, 28b are different, a difference in travel speed occurs between the pair of travel devices 24a, 24b, so that the gantry crane 20 travels while changing the direction of travel depending on the difference in travel speed. In the present disclosure, the travel speeds of the travel devices 24a, 24b are assumed to indicate amounts of change in position per unit time of the travel devices 24a, 24b. Note that the electric power for driving the electric motors 28a, 28b is supplied from a non-illustrated battery installed in the gantry crane 20 or from an electric power generator. Alternatively, the electric power is supplied from the outside through cables or bus-bars.

Figure 3:
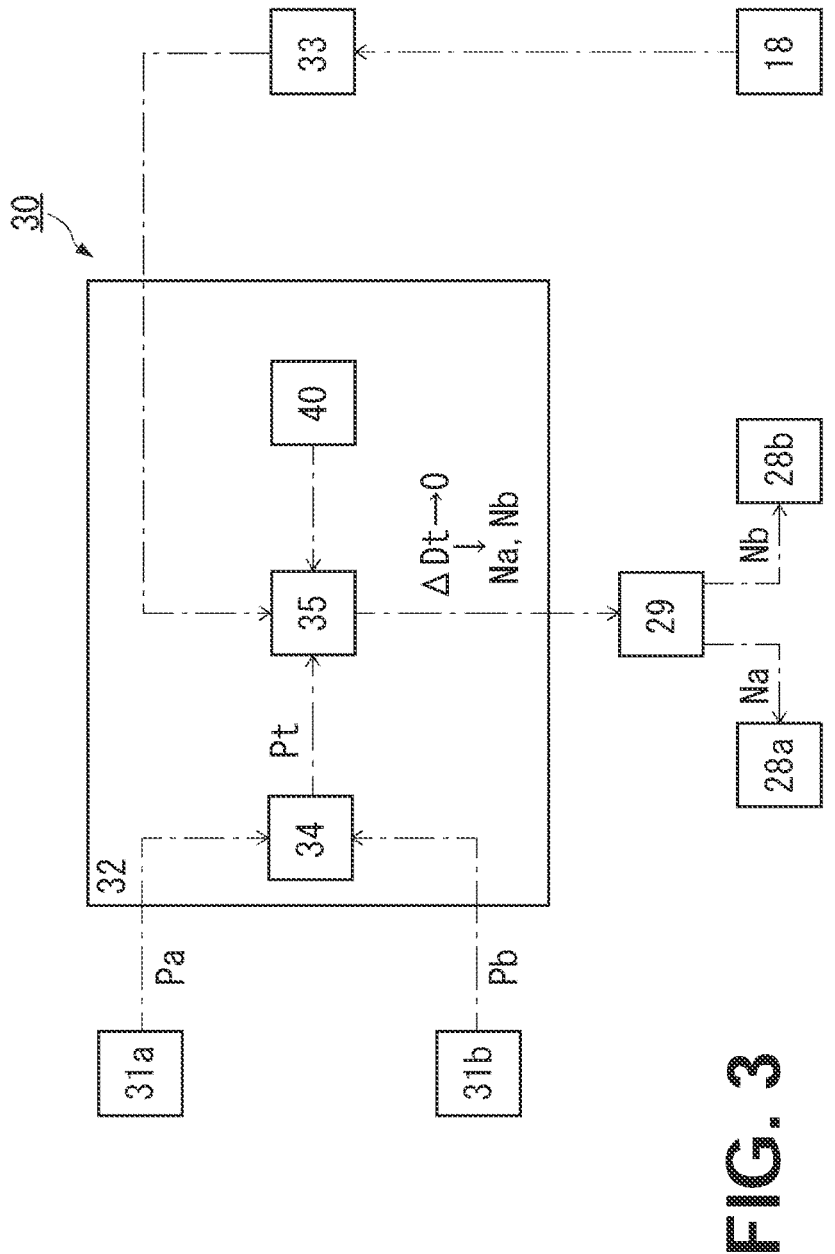
FIG. 3 is a block diagram illustrating the control system of FIG. 1.

As illustrated in FIG. 3, the control system 30 includes antennae 31a, 31b and a control device 32 in which the control device 32 is electrically connected to the inverter 29 for controlling the drive of the electric motors 28a, 28b of the travel devices 24a, 24b, the antennae 31a, 31b, and the communication instrument 33.

The antennae 31a, 31b are two antennae for the global navigation satellite system (GNSS), and measure the position coordinates Pa, Pb composed of longitude, latitude, and altitude based on information of time and the like received from a plurality of satellites for every predetermined cycle t. The method for measuring the position coordinates Pa, Pb may be, for example, the single point positioning, the relative positioning, the DGPS (differential GPS) measurement, and the RTK (real-time kinematic GPS) measurement.

The antennae 31a, 31b only have to be capable of acquiring the longitude and the latitude as plane coordinates. The antennae 31a, 31b are arranged away from each other at the opposite ends in the X direction, which is the direction orthogonal to the Y direction, that is, the direction of extension of the girder members 22, and which is the short-side direction of the structure 23, and which is the direction of travel in which the gantry cranes 20 travel in plan view. Although the antennae 31a, 31b may be installed at a position in the middle of the legs 26a of the gantry crane 20 in the Z direction or at a position near the travel devices 24a, 24b, it is desirable to install the antennae 31a, 31b at the upper ends of the legs 26a or in the upper portion of the structure 23 such as the girder members 22 because this improves the sensitivity in receiving information from the satellites.

The control device 32 is hardware composed of a central processing unit (CPU) that carries out various information processes, an internal storage unit that allows reading and writing of programs used for carrying out the various information processes and results of the information processes, various interfaces, and the like.

The control device 32 includes a position acquisition unit 34 and a travel control unit 35 as functional elements, and the travel control unit 35 carries out the control of making the gantry crane 20 travel based on the target line 40 stored in the internal storage unit in advance. The functional elements are stored in the internal storage unit of the control device 32 as programs and are read by the central processing unit to be executed as appropriate. Note that the functional elements may also be, for example, electric circuits that function independently from each other besides programs. In addition, it is also possible to configure each of the functional elements with a programmable logic controller (PLC) and form the control device 32 as a collection of a plurality of PLCs.

The position acquisition unit 34 is a functional element that receives input of position coordinates Pa, Pb acquired by the antennae 31a, 31b for every predetermined cycle t to acquire the current position Pt of the gantry crane 20 for every predetermined cycle t, and outputs the calculated current position Pt to the travel control unit 35. The position acquisition unit 34 desirably calculates the midpoint of the position coordinates Pa, Pb as the current position Pt. Note that the position acquisition unit 34 may be a functional element that calculates the current position Pt based on the position coordinates Pa, Pb and the structural dimensions of the gantry crane 20.

The current position Pt indicates the position (plane coordinate position) at which the gantry crane 20 is currently present in plan view. The current position Pt preferably indicates the position of an end portion in the Y direction or the center portion in the Y direction of the structure 23 in a plane (not limited to a horizontal plane) where the position coordinates Pa, Pb acquired by the antennae 31a, 31b installed in the upper portion of the structure 23 are present. In addition, the current position Pt preferably indicates the position of the center in the X direction of the structure 23 in plan view and more preferably indicates the position of the midpoint of the position coordinates Pa, Pb in plan view. When the current position Pt indicates the center line in the X direction of the structure 23, it is possible to make the center in the X direction of the container C the target value in control of the gantry crane 20, which is advantageous in positioning the gantry crane 20. Note that in a case where the current position Pt indicates the spatial coordinate position, the height of the current position Pt is preferably a height above the upper face of the structure 23.

The travel control unit 35 is a functional element that receives input of the current position Pt outputted from the position acquisition unit 34, and adjusts the rotation speeds Na, Nb of the electric motors 28a, 28b through the inverter 29 based on a travel deviation ΔDt between the current position Pt and the target line 40 stored in the internal storage unit in advance to adjust the respective travel speeds of the pair of travel devices 24a, 24b. The travel deviation ΔDt indicates the amount of deviation of the current position Pt from the target line 40, and indicates a distance between the current position Pt and a point of intersection of the target line 40 and a perpendicular that passes through the current position Pt and is orthogonal to the target line 40 in plan view. The travel deviation ΔDt is expressed with left deviation in the Y direction being positive and with right deviation in the Y direction being negative in the drawing.

Figure 4:
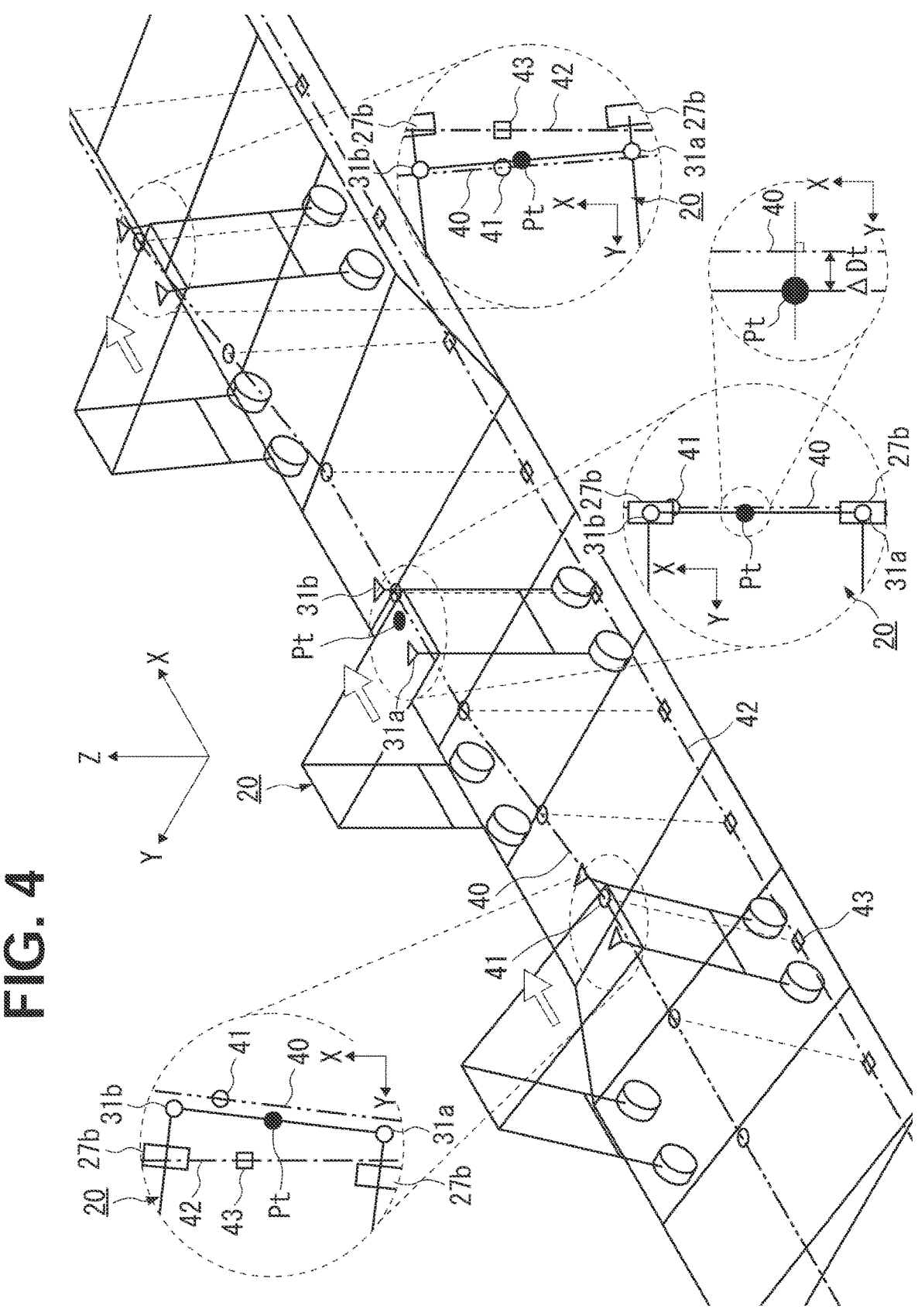
FIG. 4 is a perspective view illustrating a target line of FIG. 3.

As illustrated in FIG. 4, the target line 40 is stored (set) in the internal storage unit of the control device 32 in advance and serves as a target value in the control of making the gantry crane 20 travel. The target line 40 is set for every storage lane 13, and a plurality of target lines 40 are set in the container terminal 10. The target line 40 is composed of a line that extends in the X direction in plan view, and in a case where the traveling gantry crane 20 is inclined relative to the horizontal plane, bends in the Y direction in accordance with the inclination in the Y direction of the gantry crane 20.

The target line 40 may be, for example, a polygonal line formed by connecting a plurality of line segments at their ends. Note that the target line 40 forms a straight line extending in the X direction in plan view in a case where no inclination occurs in the traveling gantry crane 20 relative to the horizontal plane. In addition, in the present disclosure, the inclination occurring in the traveling gantry crane 20 relative to the horizontal plane is assumed to include not only an inclination due to a drainage slope provided in the road surface 48 of the container storage yard 11 but also an inclination due to degradation with time. This degradation with time may be, for example, degradation of tires 27a, 27b of the gantry crane 20 and depression of the road surface 48 of the container storage yard 11.

The target line 40 is a line that is bent at middle positions thereof in accordance with the inclination in the Y direction of the traveling gantry crane 20 with reference to the straight target line 42, which extends in the X direction and forms a straight line in plan view, as described later. The target line 40 is composed of a trace connecting a plurality of current positions Pt in the order of travel that are acquired by the position acquisition unit 34 during the travel in a case where the gantry crane 20 is made to travel using the straight target line 42 as the target value in experiments or tests in advance. Alternatively, the target line 40 may be composed of a trace connecting a plurality of current positions Pt in the order of travel that are predicted to be acquired by the position acquisition unit 34 in a case where the gantry crane 20 is assumed to have traveled using the straight target line 42 as the target value in a simulation in advance.

For example, in a case where the traveling gantry crane 20 is inclined to the right side in the Y direction at a position where the road surface of the container storage yard 11 is inclined downward toward the right side in the Y direction, the target line 40 is located on the right side in the Y direction from the straight target line 42 in plan view and is bent before and after that position. In addition, in a case where the traveling gantry crane 20 is not inclined at a position where the road surface of the container storage yard 11 is horizontal, the target line 40 matches the straight target line 42 in plan view and is straight in the X direction. In addition, in a case where the traveling gantry crane 20 is inclined to the left side in the Y direction at a position where the road surface 48 of the container storage yard 11 is inclined downward toward the left side in the Y direction, the target line 40 is located on the left side in the Y direction from the straight target line 42 in plan view and is bent before and after that position.

Note that each of the target line 40 and the straight target line 42 only has to have coordinate information of the X-Y plane and does not have to contain coordinate information of the Z direction. In a case where the target line 40 and the straight target line 42 contain coordinate information of the Z direction, the height in the Z direction of the target line 40 is preferably set to a height of the antennae 31a, 31b using the road surface 48 of the container storage yard 11 as a height reference.

The target line 40 desirably has a plurality of target positions 41 and is composed of a polygonal line that is bent at positions before and after each of these target positions 41 where the inclination in the Y direction of the gantry crane 20 changes serving as an inflection point.

A plurality of target positions 41 are arranged on the target line 40, and one of the target positions 41 is a position serving as a stopping target position of the gantry crane 20 traveling based on the target line 40. The target positions 41 are positions associated with stopping positions 43 arranged at intervals of predetermined distance on the straight target line 42 as described later. The target positions 41 are positions each shifted to the front or back in the X direction in accordance with the inclination in the X direction of the traveling gantry crane 20 and shifted to the right or left in the Y direction in accordance with the inclination in the Y direction, relative to the corresponding stopping position 43, in plan view.

The stopping position 43 are positions that are arranged on the straight target line 42, which extends in the X direction and forms a straight line in plan view, and arranged at predetermined distances on the straight target line 42, and are positions based on the road surface of the container storage yard 11. In other words, the stopping positions 43 are positions based on the travel devices 24a, 24b. In a case where the straight target line 42 is a straight line extending in the X direction, which is the longitudinal direction of the storage lane 13, the stopping position 43 is preferably set for every bay which indicates the arrangement position of the container C in the X direction of the storage lane 13, and is more preferably set at the center in the X direction of the bay.

For example, in a case where the traveling gantry crane 20 is inclined to the front side in the X direction at a position where the road surface 48 of the container storage yard 11 is inclined downward toward the front side in the X direction, the target position 41 is located on the front side in the X direction from the corresponding stopping position 43 in plan view. In addition, in a case where the traveling gantry crane 20 is not inclined at a position where the road surface 48 of the container storage yard 11 is horizontal, the target position 41 matches the stopping position 43 in plan view. In addition, in a case where the traveling gantry crane 20 is inclined to the back side in the X direction at a position where the road surface 48 of the container storage yard 11 is inclined downward toward the back side in the X direction, the target position 41 is located on the back side in the X direction from the corresponding stopping position 43 in plan view. In addition, in a case where the traveling gantry crane 20 is inclined to the right side in the Y direction at a position where the road surface 48 of the container storage yard 11 is inclined downward toward the right side in the Y direction, the target position 41 is located on the right side in the Y direction from the corresponding stopping position 43 in plan view. In addition, in a case where the traveling gantry crane 20 is inclined to the left side in the Y direction at a position where the road surface 48 of the container storage yard 11 is inclined downward toward the left side in the Y direction, the target position 41 is located on the left side in the Y direction from the corresponding stopping position 43 in plan view.

Note that in the case where the target line 40 contains coordinate information of the Z direction, the target position 41 shifts up or down in the Z direction in accordance with the inclination in the X direction of the gantry crane 20. In this case, the target line 40 becomes a three-dimensional polygonal line.

Figure 5:
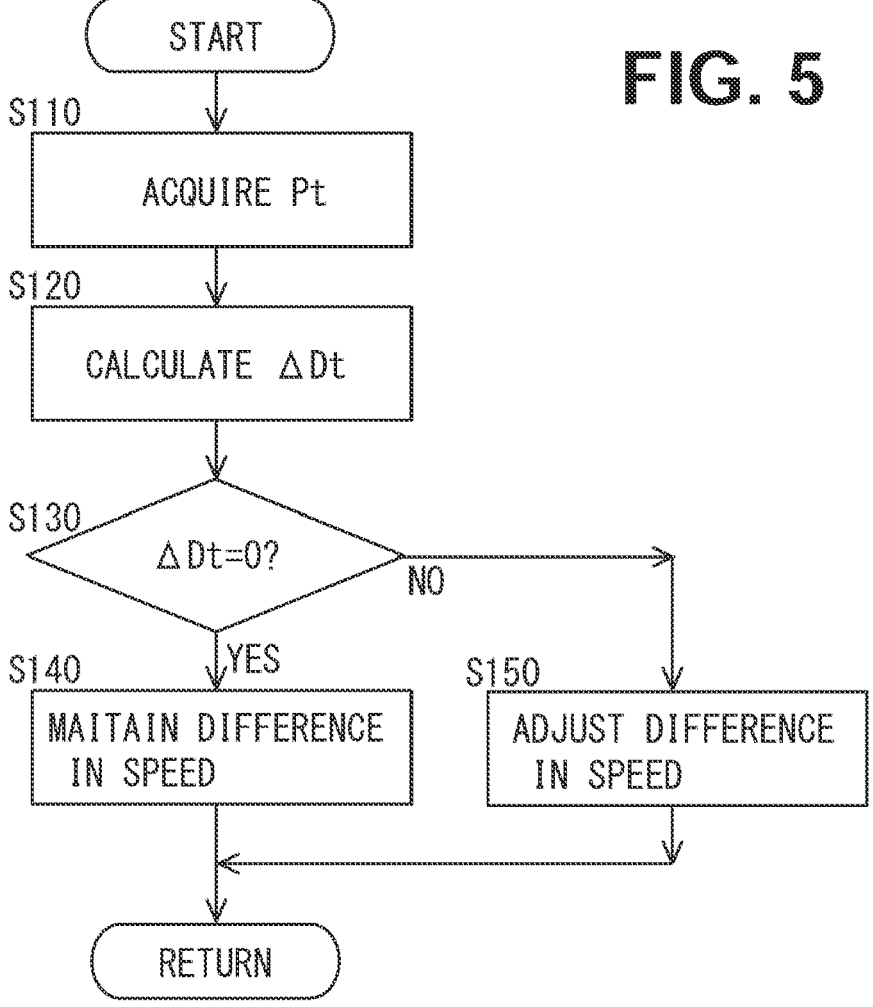
FIG. 5 is a flowchart illustrating a first embodiment of a crane control method.

As illustrated in FIG. 5, the control method for the gantry crane 20 of the first embodiment is a method including: making the communication: instrument 33 receive cargo-handling instructions from the upper system 18; and making the gantry crane 20 travel based on the cargo-handling instructions. This control method is repeated for every predetermined cycle t while the gantry crane 20 is being made to travel. Note that in the control method of the present disclosure, it is assumed that the position serving as the stopping target position of the gantry crane 20 is set at the time of start, and the control method is ended once the gantry crane 20 is stopped at the position serving as the stopping target position.

After the start, the antennae 31a, 31b acquire the position coordinates Pa, Pb, and the position acquisition unit 34 acquires the current position Pt of the gantry crane 20 based on the position coordinates Pa, Pb (S110).

Subsequently, the travel control unit 35 calculates the travel deviation ΔDt based on the preset target line 40 and the current position Pt acquired by the position acquisition unit 34 (S120). Subsequently, the travel control unit 35 determines whether or not the calculated travel deviation ΔDt is zero (S130). If it is determined that the travel deviation ΔDt is zero (S130: YES), the travel control unit 35 maintains the difference in travel speed between the pair of travel devices 24a, 24b at the current difference in travel speed through the inverter 29 (S140), and the processing returns to the start. On the other hand, if it is determined that the travel deviation ΔDt is not zero (S150: NO), the travel control unit 35 adjusts the difference in travel speed between the pair of travel devices 24a, 24b to a difference in travel speed that makes the travel deviation ΔDt zero through the inverter 29 (S150), and the processing returns to the start.

As described above, the control system 30 of the first embodiment controls the travel of the gantry crane 20 based on not the straight target line 42, which forms a straight line in plan view, but the target line 40, which reflects the inclination in the Y direction of the traveling gantry crane 20 to bent in plan view with reference to the road surface 48 of the container storage yard 11. For this reason, this control system 30 makes it possible to omit calculation of converting the current position Pt acquired by the position acquisition unit 34 into a value based on the road surface by using the target line 40, which reflects the inclination of the traveling gantry crane 20, as the target value for the travel control. This is advantageous in reducing the frequency of calculation in travel control, making it possible to reduce the load on the calculation process, and also making it possible to reduce the probability that a calculation error occurs. Along with this, it becomes possible to carry out precise and high-speed control of making the gantry crane 20 travel, making it possible to precisely and quickly position the gantry crane 20 at the target position.

In addition, the control system 30 sets the target position 41, which is displaced to the front, back, right, or left in accordance with the inclination of the gantry crane 20 from the corresponding stopping position 43 in plan view as the position serving as the stopping target position of the gantry crane 20. For this reason, the control system 30 becomes advantageous in positioning in the cargo handling operation of the gantry crane 20 by stopping the travel while matching the current position Pt of the gantry crane 20 with the target position 41 through the travel control.

The current position Pt may be acquired based on position coordinates acquired by one antenna of the global navigation satellite system, or may be acquired using an antenna capable of communicating with the upper system 18 in addition to the global navigation satellite system.

Figure 6:
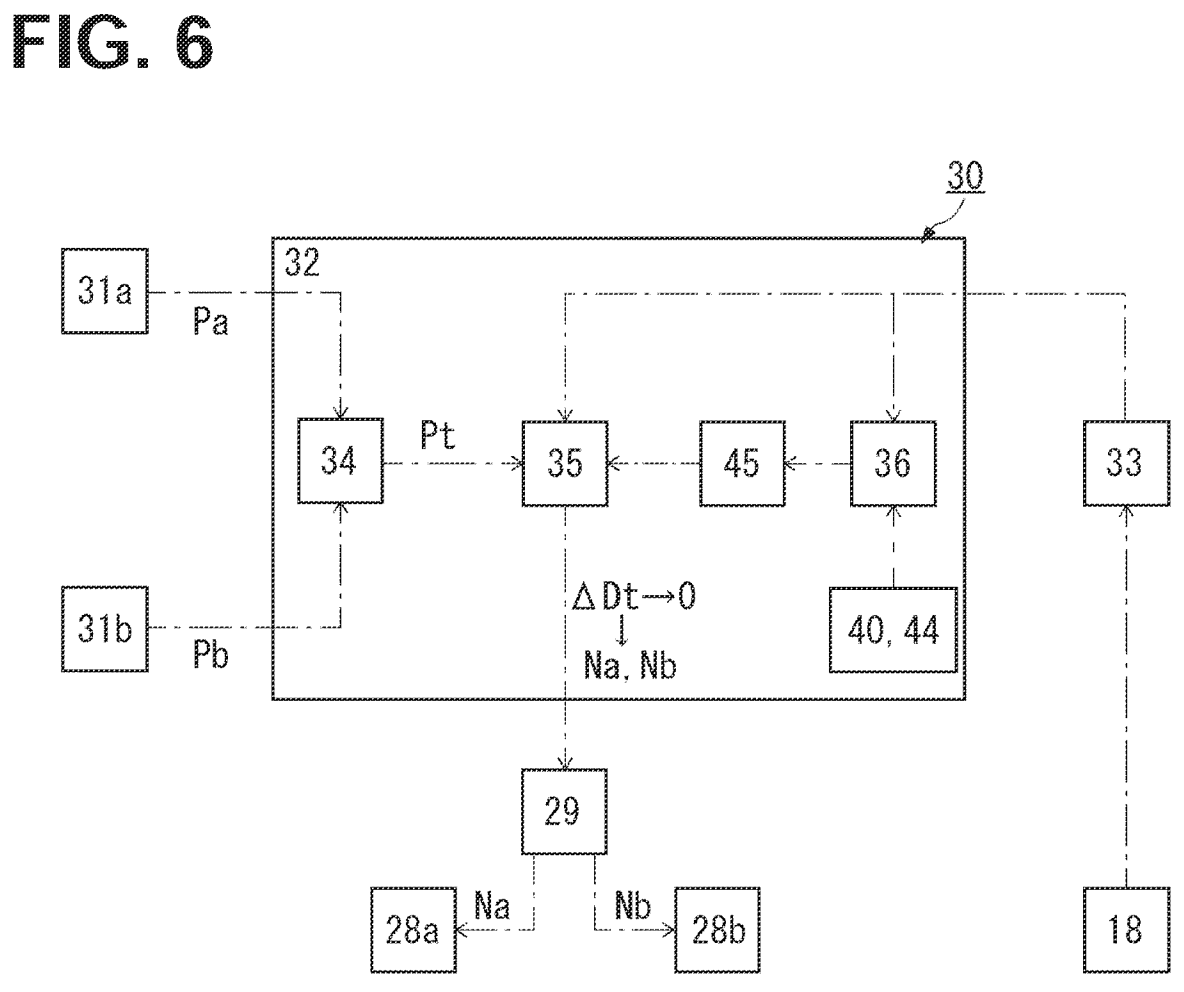

As illustrated in FIG. 6, the control system 30 of a second embodiment is different from the first embodiment in that the control device 32 has a target region 44 corresponding to the target line 40 in the internal storage unit and includes a setting unit 36 which sets a second target line 45 using the target region 44 as a functional element, and the travel control unit 35 uses the second target line 45 instead of the target line 40.

The setting unit 36 is a functional element that receives input of the target line 40 and the target region 44 stored in the internal storage unit in advance, creates the second target line 45 as a target value from a starting point P0 of travel control to an ending point P1 of travel control, and outputs the second target line 45 to the travel control unit 35.

Figure 7:
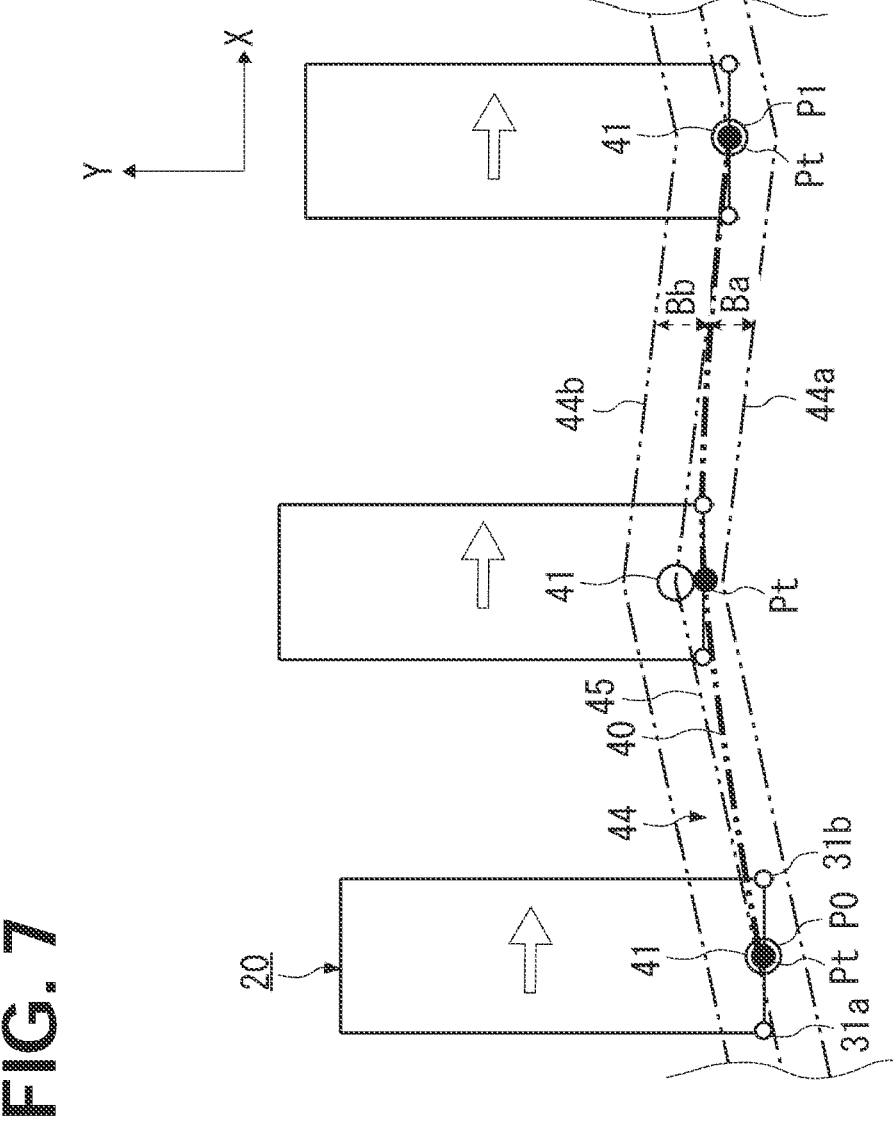
FIG. 7 is a plan view illustrating a second target line of FIG. 6.
Figure 8:
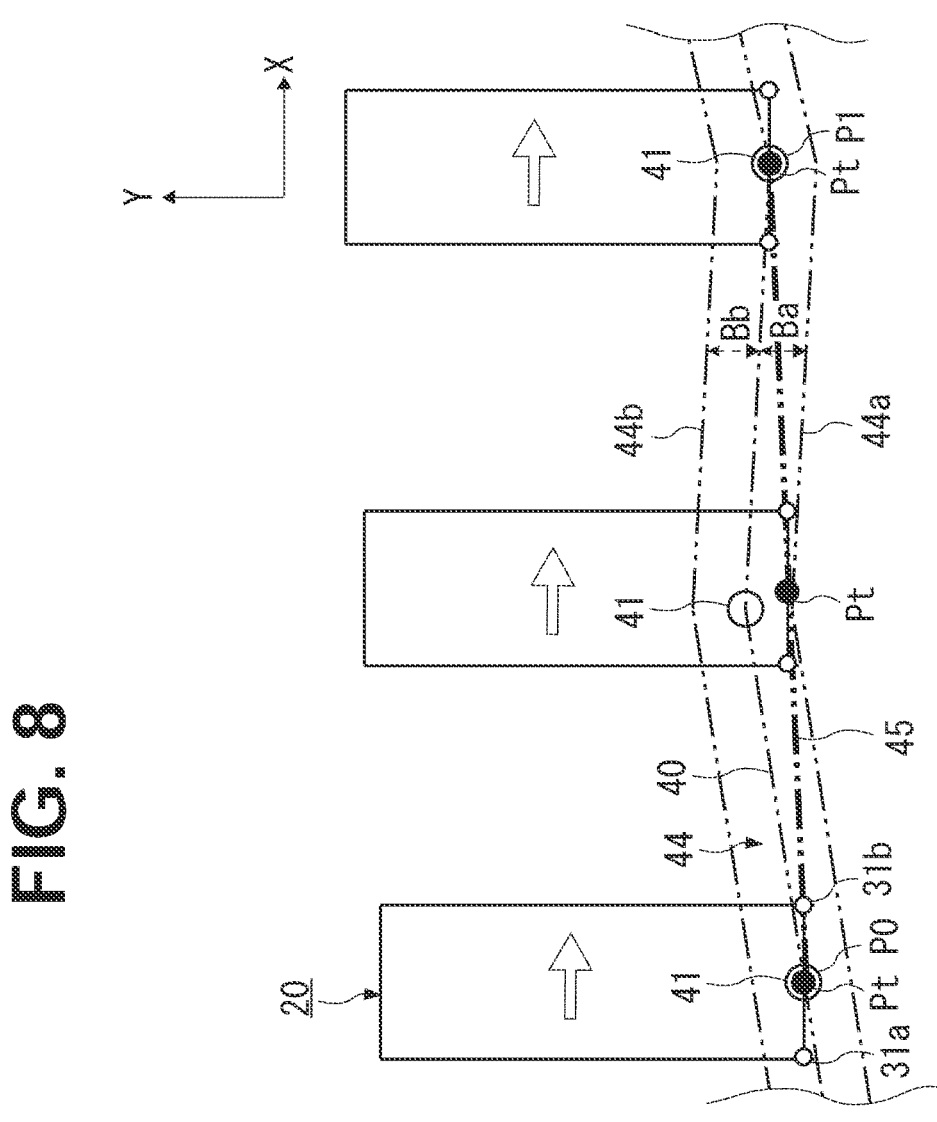
FIG. 8 is a plan view illustrating another example of the second target line of FIG. 6.

As illustrated in FIG. 7 and FIG. 8, the target region 44 is a region that extends from the target line 40 to both sides in the Y direction with predetermined widths Ba, Bb, respectively, in plan view, and is surrounded by one limitation end 44a and an opposite limitation end 44b in the Y direction. The target region 44 is set as a region that does not cause the traveling gantry crane 20 to collide with a container C stored on the storage lane 13 or with another gantry crane 20 travelling while straddling another storage lane 13 adjacent to the former storage lane 13, and a region that does not cause the traveling gantry crane 20 to enter a travel path along the storage lane 13 on which the compound chassis 15 or the intersectional chassis 16 travels, through experiments or tests or simulation, like the target line 40.

The widths Ba, Bb are set to such widths that even when the current position Pt of the traveling gantry crane 20 reaches the one limitation end 44a, collision or entrance of the structure 23 and the pair of travel devices 24a, 24b can be avoided. Note that the widths Ba, Bb may be set to different values.

The second target line 45 is a target value for travel control and is set to a path different from a path that follows the target line 40 from the starting point P0 to the ending point P1 within a range covered by the target region 44. The path length of the second target line 45 is preferably shorter than the path length that follows the target line 40 from the starting point P0 to the ending point P1, and more preferably of the shortest distance from the starting point P0 to the ending point P1 within a range covered by the target region 44. The second target line 45 may be, for example, a spline curve of FIG. 7, an approximate straight line of FIG. 8, or a continuation of spline curves or approximate straight lines of a plurality of sections divided from the starting point P0 to the ending point P1. Note that the starting point P0 is a point to start the travel control and may be, for example, the current position of the gantry crane 20 before the travel control is carried out, and the ending point P1 may be, for example, a position serving as the stopping target position instructed in the cargo-handling instructions received from the upper system 18.

The travel control unit 35 is a functional element that receives input of the current position Pt outputted from the position acquisition unit 34 and the second target line 45 set by the setting unit 36 instead of the target line 40, and adjusts the rotation speeds Na, Nb of the electric motors 28a, 28b through the inverter 29 based on a travel deviation ΔDt between the second target line 45 and the current position Pt to adjust the respective travel speeds of the pair of travel devices 24a, 24b.

Figure 9:
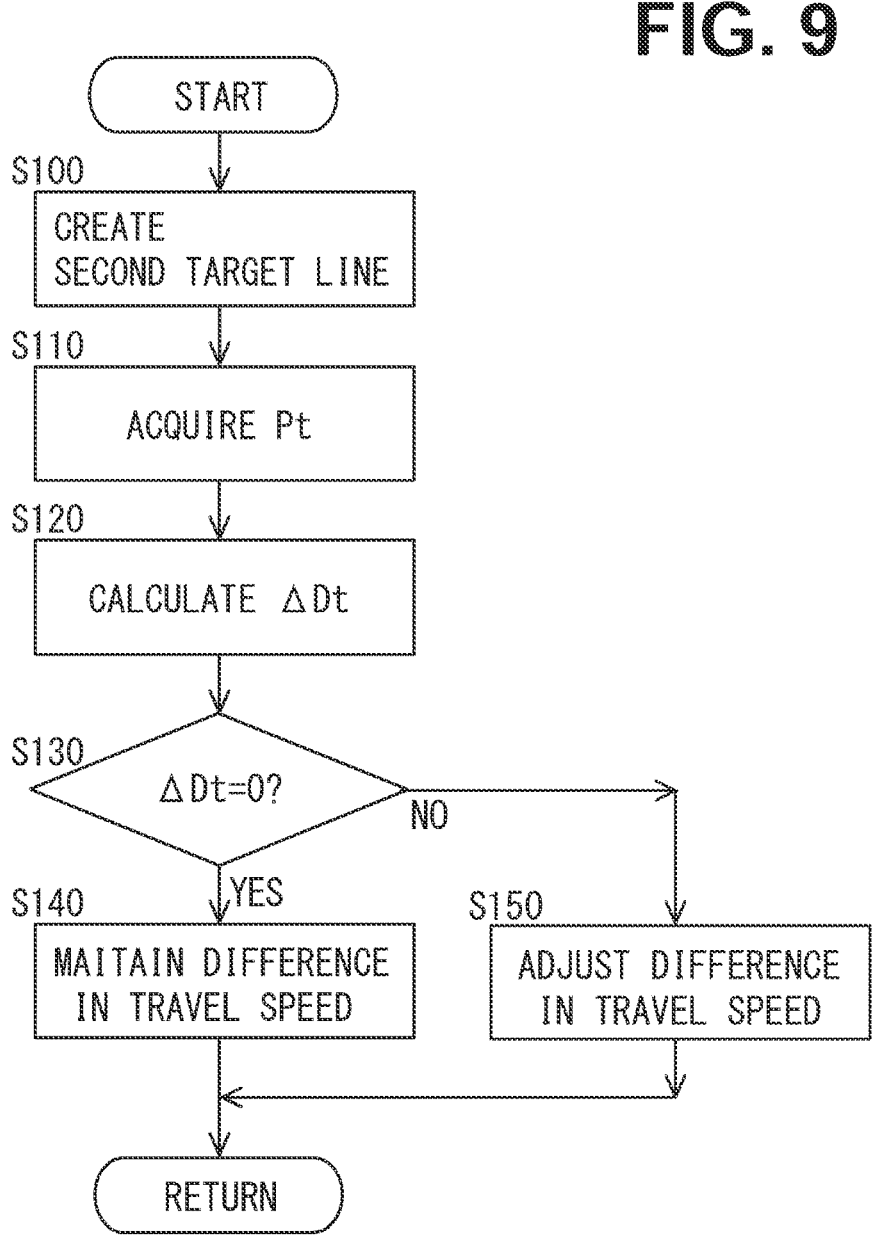
FIG. 9 is a flowchart illustrating a second embodiment of the crane control method.

As illustrated in FIG. 9, the control method for the gantry crane 20 of the second embodiment is such that the communication instrument 33 receives the cargo-handling instructions from the upper system 18, and when the gantry crane 20 is made to travel based on the cargo-handling instructions, the setting unit 36 sets the second target line 45 before the above-described step S110 in the aforementioned control method (S100). Also, the travel control unit 35 uses the set second target line 45 in the above-described step S120.

As described above, using the second target line 45 makes it possible for the control system 30 of the second embodiment to carry out precise and high-speed travel control on the gantry crane 20, making it possible to precisely and quickly position the gantry crane 20 at the target position.

In addition, the control system 30 seeks not a path that follows the target line 40 but a path that allows for smooth travel or a path that allows for speedier arrival at the position serving as the stopping target position, as the target value for travel control. For this reason, using a smoothly curved path as the target value for travel control is advantageous in gently changing a speed difference between the pair of travel devices 24a, 24b, making it possible to suppress swinging of the gantry crane 20 associated with abrupt change in speed difference. In addition, using a path that is shorter than the path length of a path that follows the target line 40 as the target value for travel control is advantageous in making the gantry crane 20 arrive at the position serving as the stopping target position more speedily, making it possible to shorten the time taken for travel control.

Note that the control system 30 may set the target line having a path length longer than the path length of the path that follows the target line 40 within a range covered by the target region 44 as the target value for travel control depending on the situation.

Figure 10:
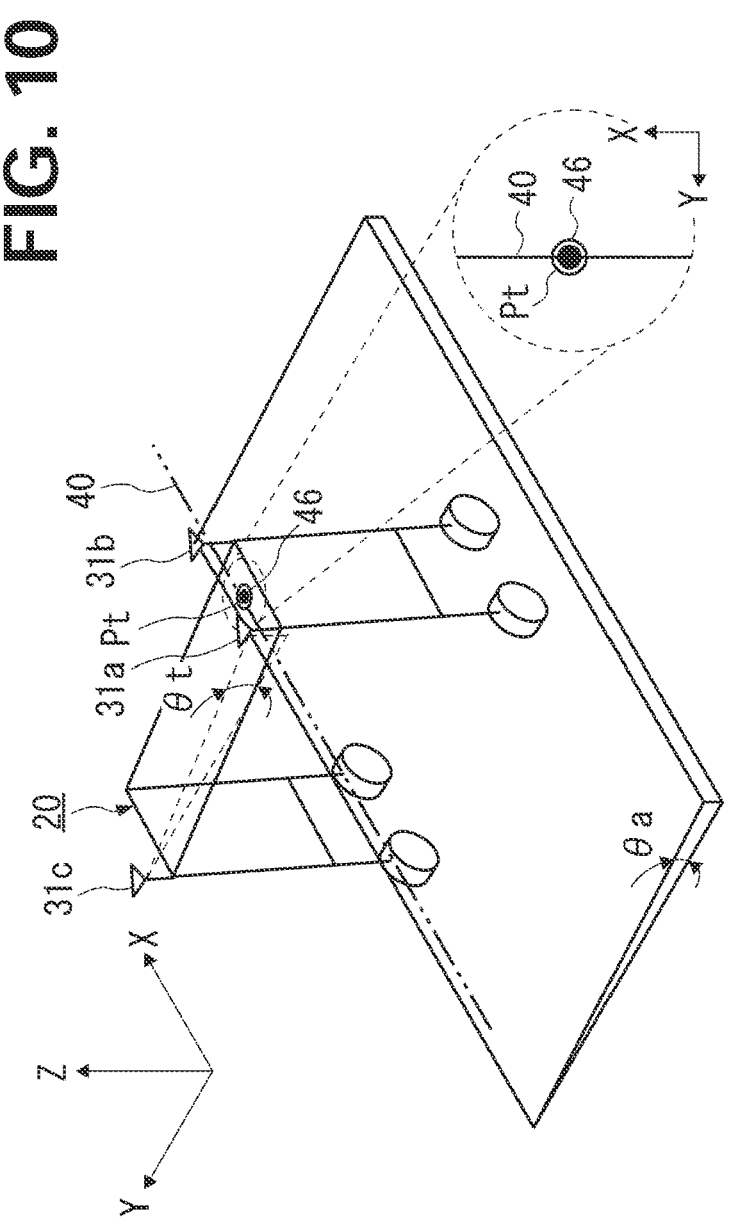
FIG. 10 is a perspective view illustrating a crane equipped with a third embodiment of the control system.
Figure 11:
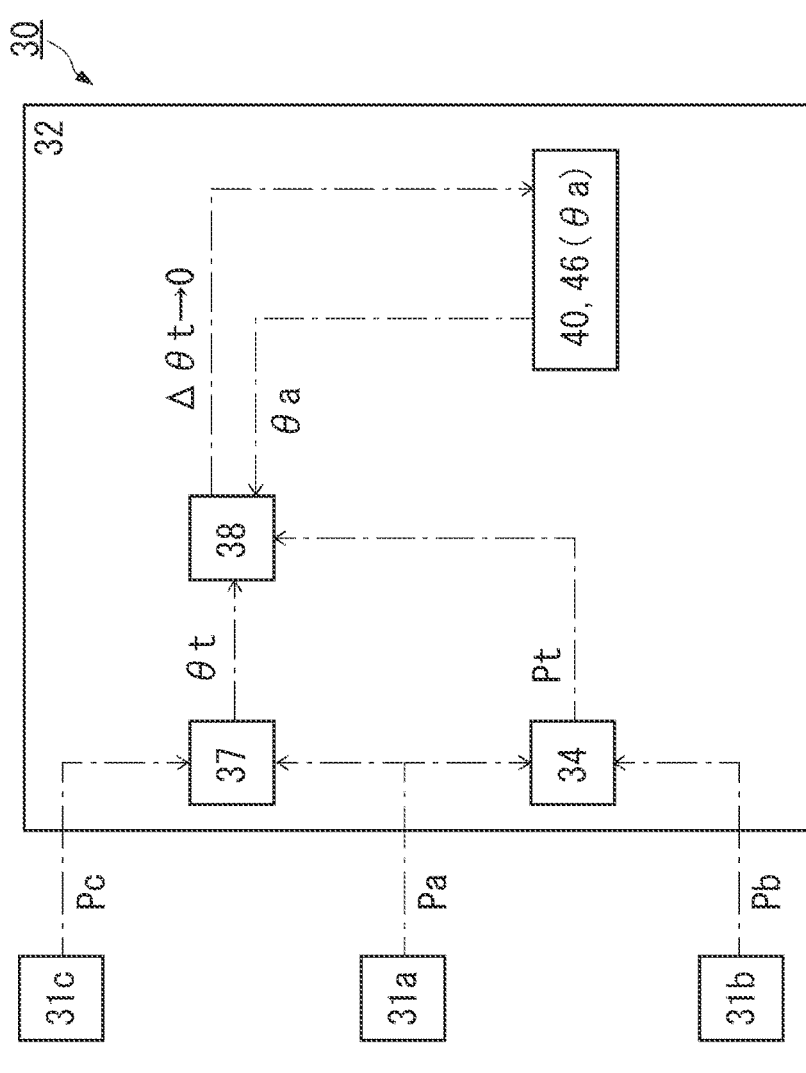
FIG. 11 is a block diagram illustrating the control system of FIG. 10.

As illustrated in FIG. 10 and FIG. 11, the control system 30 of a third embodiment is different in that the control system 30 includes an antenna 31c. In addition, the control system 30 of the third embodiment is different in that the control device 32 has an inclination in the Y direction of the gantry crane 20, that is, a reference inclination θa that serves as a reference angle about the X axis, as a reference value when the current position Pt matches the correction position 46 in the internal storage unit, and includes a parameter acquisition unit 37 and a correction unit 38 as functional elements. This reference inclination θa is an inclination relative to the horizontal plane.

The antenna 31c is an antenna for the global navigation satellite system (GNSS) like the antennae 31a, 31b, and acquires position coordinates Pc composed of longitude, latitude, and altitude based on information of time and the like received from a plurality of satellites for every predetermined cycle t. The antenna 31c is arranged at the opposite end portion in the X direction of the structure 23 away from the antenna 31a or the antenna 31b in plan view. Note that in this embodiment, the antennae 31a, 31b, 31c are configured to be capable of acquiring longitude, latitude, and altitude as space coordinates (three-dimensional coordinates) utilizing the global navigation satellite system.

When the shape of the structure 23 of the gantry crane 20 in plan view is assumed to be substantially rectangular, the three antennae 31a to 31c are arranged at three corner portions among four corner portions of the rectangle. Arranging the antennae 31a to 31c in this manner is advantageous in acquiring the inclination in the X direction and the inclination in the Y direction of the gantry crane 20.

At least one correction position 46 is arranged on the target line 40. A plurality of correction positions 46 are preferably arranged on one target line 40, and more preferably composed of a plurality of target positions 41 arranged on the target line 40. Forming the correction position 46 with the target position 41 makes it possible to carry out a correction control every time the gantry crane 20 passes through the target position 41 or stops at the target position 41 for travel control, and is thus advantageous in increasing the frequency of correction.

For the reference inclination θa, the inclination in the Y direction among the inclinations of the road surface 48 of the container storage yard 11 at the correction position 46 is set as an initial value, and the reference inclination θa indicates the inclination on the right or left side in the Y direction among the inclinations of the gantry crane 20 when the current position Pt matches the correction position 46. In the present disclosure, when the current position Pt matches the correction position 46 includes when the current position Pt with the gantry crane 20 stopped matches the correction position 46, and also when the current position Pt passes through the correction position 46 during the travel of the gantry crane 20.

The parameter acquisition unit 37 is a functional element that receives input of the position coordinates Pa, Pc acquired by the antennae 31a, 31c for every predetermined cycle t, calculates an inclination θt of the gantry crane 20 relative to the horizontal plane as a parameter for every predetermined cycle t, and outputs the calculated inclination θt to the correction unit 38. In the present disclosure, the parameter indicates a value that varies depending on the inclination in the Y direction of the gantry crane 20, and may specifically be, for example, the inclination et.

The correction unit 38 is a functional element that receives input of the inclination θt as the parameter acquired by the parameter acquisition unit 37 and corrects the target line 40 based on a correction deviation Δθt between the inputted inclination θt and the reference inclination θa, which is a reference value stored in the internal storage unit in advance.

The correction deviation Δθt is a value obtained by subtracting the inclination θt from the reference inclination θa, and an inclination to the left side in the Y direction in the drawing is positive while an inclination to the right side in the Y direction is negative. For example, when the correction deviation Δθt is negative, an inclination to the right side in the Y direction has occurred in the gantry crane 20 due to a degradation with time, and the lower portion of the structure 23 and the travel device 24b in the gantry crane 20 get closer to the side of the storage lane 13 as the current position Pt matches the correction position 46. On the other hand, when the correction deviation Δθt is positive, an inclination to the left side in the Y direction has occurred in the gantry crane 20 due to a degradation with time, and the lower left portion of the structure 23 and the travel device 24a in the gantry crane 20 get closer to the side of the storage lane 13 as the current position Pt matches the correction position 46.

When the correction deviation Δθt is positive, the correction unit 38 corrects the target line 40 by displacing the target line 40 to the left side in the Y direction in parallel in plan view such that the correction deviation Δθt becomes zero. On the other hand, when the correction deviation Δθt is negative, the correction unit 38 corrects the target line 40 by displacing the target line 40 to the right side in the Y direction in parallel in plan view such that the correction deviation Δθt becomes zero.

Figure 12:
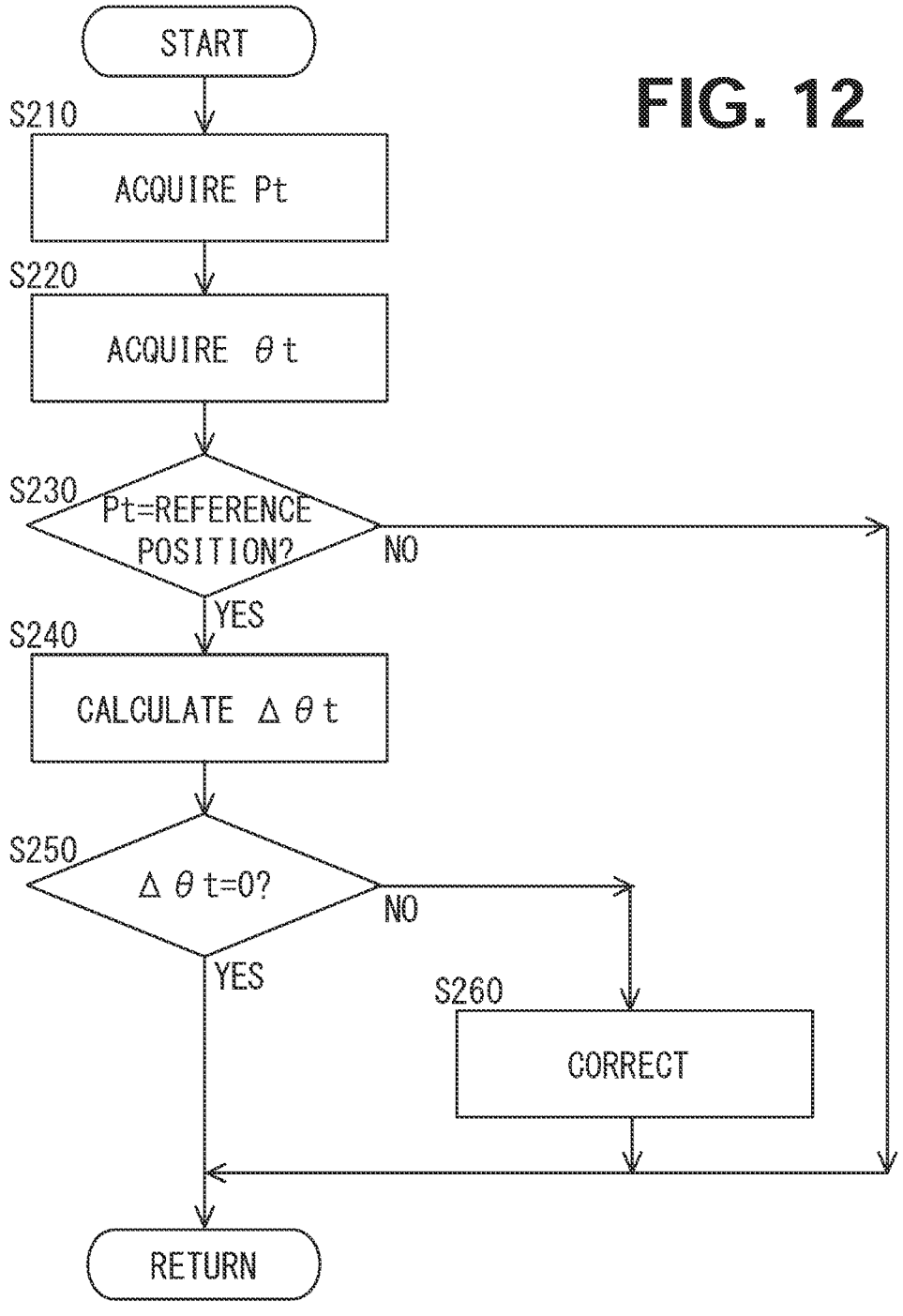
FIG. 12 is a flowchart illustrating a third embodiment of the crane control method.

As illustrated in FIG. 12, the control method for the gantry crane 20 by the control system 30 of the third embodiment is a method that is repeated during the travel of the gantry crane 20. In addition, this method is also carried out when the gantry crane 20 is stopped.

After the start, the antennae 31a, 31b, 31c acquire position coordinates Pa, Pb, Pc, and the position acquisition unit 34 acquires the current position Pt of the gantry crane 20 based on the position coordinates Pa, Pb (S210). Subsequently, the parameter acquisition unit 37 acquires a current inclination $\theta t$ in the Y direction of the gantry crane 20 as a parameter based on the position coordinates Pa, Pc (S220).

Subsequently, the correction unit 38 determines whether or not the current position Pt acquired by the position acquisition unit 34 matches the correction position 46 (S230). If it is determined that the current position Pt do not match the correction position 46 (S230: NO), the processing returns to the start. On the other hand, if it is determined that the current position Pt matches the correction position 46 (S230: YES), the correction unit 38 calculates the correction deviation $\Delta\theta t$ based on the inclination $\theta t$, which is the parameter acquired by the parameter acquisition unit 37, and the reference inclination $\theta a$, which is the reference value set in advance (S240).

Subsequently, the correction unit 38 determines whether or not the calculated correction deviation $\Delta\theta t$ is zero (S250). If it is determined that the correction deviation $\Delta\theta t$ is zero (S250: YES), the processing returns to the start. On the other hand, on the other hand, if it is determined that the correction deviation $\Delta\theta t$ is not zero (S250: NO), the correction unit 38 corrects the target line 40 such that the correction deviation $\Delta\theta t$ becomes zero (S260), and the processing returns to the start.

As described above, when the current inclination $\theta t$ of the gantry crane 20 is displaced from the reference inclination $\theta a$, the control system 30 of the gantry crane 20 of the third embodiment corrects the target line 40 to reflect the displacement. This allows the corrected target line 40 to correspond to a degradation with time of the gantry crane 20 and a degradation with time of the road surface 48 of the container storage yard 11, making it possible to carry out precise and high-speed travel control on the gantry crane 20 and to precisely and quickly position the gantry crane 20 at the target position.

In addition, in the correction, the control system 30 does not correct the reference inclination $\theta a$ but corrects only the target line 40, which the control system 30 has. This makes it possible to carry out the travel control depending on the situation different among the gantry cranes 20. Note that when a plurality of gantry cranes 20 have traveled on one storage lane 13, if similar correction has been carried out with the control systems 30 of all the plurality of gantry cranes 20, the road surface of the container storage yard 11 may be regarded as having been degraded with time, and the reference inclination Oa may be corrected.

Figure 13:
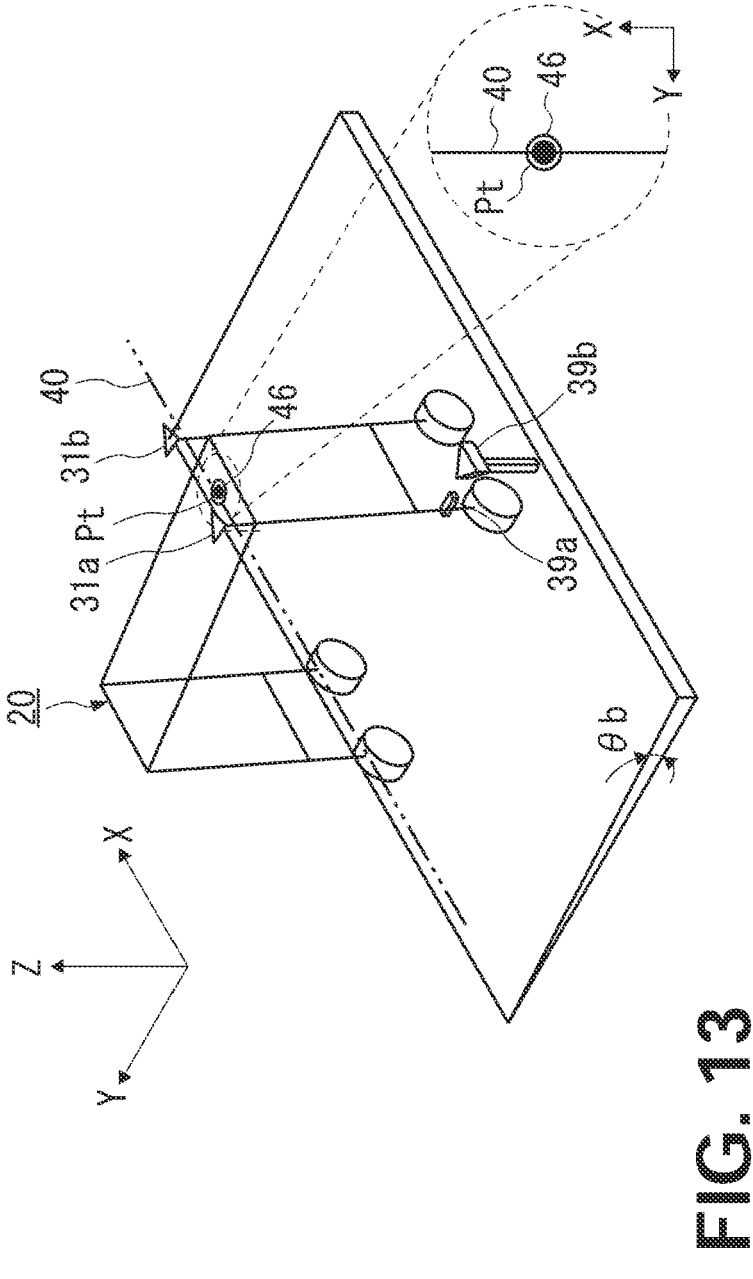
FIG. 13 is a perspective view illustrating a crane equipped with a fourth embodiment of the control system.
Figure 14:
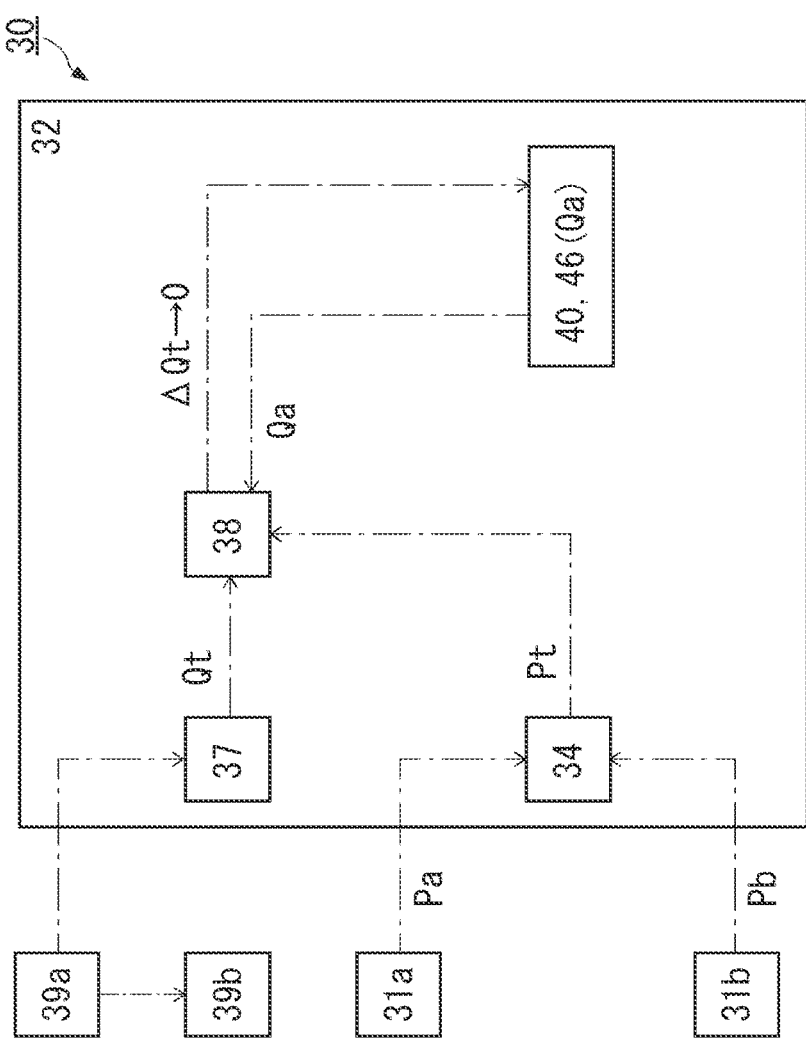
FIG. 14 is a block diagram illustrating the control system of FIG. 13.
Figure 15:
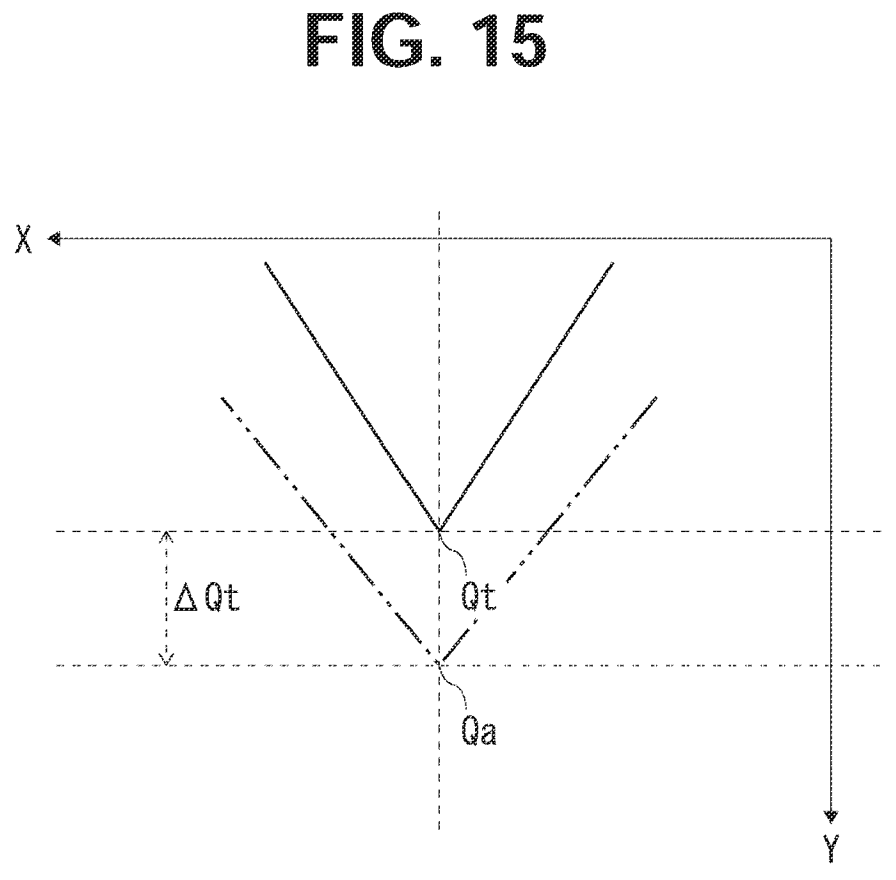

As illustrated in FIG. 13 to FIG. 15, the control system 30 of a fourth embodiment is different in that the control system 30 includes a correction position acquisition device 39a and a correction target 39b instead of the antenna 31a. In addition, the control system 30 of the fourth embodiment is different in that the control device 32 has a reference position Qa for the correction target 39b as a reference value when the current position Pt matches the correction position 46 in the internal storage unit, the parameter acquisition unit 37 acquires position coordinates Qt for the correction target 39b as a parameter, and the correction unit 38 corrects the target line 40 based on a correction deviation $\Delta Qt$ between the position coordinates Qt and the reference position Qa.

The correction position acquisition device 39a is a device that is installed in the structure 23 or the travel device 24b of the gantry crane 20 and measures a distance from the correction position acquisition device 39a to the correction target 39b for every predetermined cycle t. The correction position acquisition device 39a may be, for example, a one-dimensional, two-dimensional, or three-dimensional lidar sensor.

At least one correction target 39b is installed along the target line 40, and the installation position may be, for example, a position that allows the correction position acquisition device 39a to carry out measurement when the current position Pt of the gantry crane 20 matches the correction position 46. It is preferable that the correction target 39b be one that allows the correction position acquisition device 39a to specify the cross-sectional shape of the side portion (left side portion in the Y direction) facing the gantry crane 20 from a plurality of distances measured for every predetermined cycle t, and it is more preferable that the cross-sectional shape of the side portion be a shape having at least one corner between the opposite ends in the X direction. In the present disclosure, the side portion facing the gantry crane 20 is a portion whose distance can be measured by the correction position acquisition device 39a. In addition, the shape having at least one corner between the opposite ends in the X direction may be, for example, a triangular shape, a stepwise shape, or a polygonal shape (however, except for a rectangular shape). Note that such shape is not limited to one in which the corner protrudes to the left side in the Y direction but may be one in which the corner is depressed to the right side in the Y direction. When the horizontal cross-sectional shape of the side portion of the correction target 39b is formed into a shape having at least one corner between the opposite ends in the X direction, it becomes possible to specify the plane coordinates of the corner from the cross-sectional shape determined by the correction position acquisition device 39a, and to thus determine the position coordinates Qt of the correction target 39b from the determined plane coordinates of the corner.

For the reference position Qa, the position coordinates of the correction target 39b that are measured by the correction position acquisition device 39a in advance in a state where the current position Pt of the gantry crane 20 matches the correction position 46 are set as an initial value. Note that as the reference position Qa, a calculated value calculated based on the inclination in the Y direction among the inclinations of the road surface of the container storage yard 11 at the correction position 46 may be used.

The parameter acquisition unit 37 is a functional element that receives input of a plurality of distances acquired by the correction position acquisition device 39a for every predetermined cycle t, calculates the position coordinates Qt of the correction target 39b as a parameter, and outputs the calculated position coordinates Qt to the correction unit 38. In the present disclosure, the parameter indicates a value that varies depending on the inclination in the Y direction of the gantry crane 20, and may specifically be, for example, the position coordinates Qt of the correction target 39b.

The correction unit 38 is a functional element that receives input of the position coordinates Qt acquired by the parameter acquisition unit 37 and corrects the target line 40 based on a correction deviation $\Delta Qt$ between the inputted position coordinates Qt and the reference position Qa, which is a reference value stored in the internal storage unit in advance.

The correction deviation $\Delta Qt$ is a value obtained by subtracting the position coordinates Qt from the reference position Qa, and a separation distance to the left side in the Y direction in the drawing is positive while a separation distance to the right side in the Y direction is negative. For example, when the correction deviation $\Delta Qt$ is negative, an inclination to the right side in the Y direction has occurred in the gantry crane 20 due to a degradation with time, and the lower portion of the structure 23 and the travel device 24$b$ in the gantry crane 20 get closer to the side of the storage lane 13 as the current position Pt matches the correction position 46. On the other hand, when the correction deviation ΔQt is positive, an inclination to the left side in the Y direction has occurred in the gantry crane 20 due to a degradation with time, the lower left portion of the structure 23 and the travel device 24$a$ in the gantry crane 20 get closer to the side of the storage lane 13 as the current position Pt matches the correction position 46.

When the correction deviation ΔQt is positive, the correction unit 38 corrects the target line 40 by displacing the target line 40 to the left side in the Y direction in parallel in plan view such that the correction deviation ΔQt becomes zero. On the other hand, when the correction deviation ΔQt is negative, the correction unit 38 corrects the target line 40 by displacing the target line 40 to the right side in the Y direction in parallel in plan view such that the correction deviation ΔQt becomes zero.

The control method for the gantry crane 20 by the control system 30 of the fourth embodiment is a method that may be obtained by replacing the inclination θt with the position coordinates Qt and the correction deviation Δθt with the correction deviation ΔQt in the flowchart illustrated in FIG. 12 and is carried out in similar procedures.

As described above, when the acquired position coordinates Qt of the correction target 39$b$ are displaced from the reference position Qa, the control system 30 of the gantry crane 20 of the fourth embodiment corrects the target line 40 to reflect the displacement. This makes it possible to carry out precise and high-speed travel control on the gantry crane 20 and to precisely and quickly position the gantry crane 20 at the target position.

The control systems 30 of the third embodiment and the fourth embodiment may be configured to correct the position of the target position 41 on the target line 40 in accordance with the inclination in the X direction of the gantry crane 20 by the same method as that for correcting displacement in the Y direction. For example, if the gantry crane 20 is inclined to the front side in the X direction when the current position Pt of the gantry crane 20 matches the correction position 46, the target position 41 is corrected to the position on the front side in the X direction relative to the corresponding stopping position 43 in plan view. In this way, correcting the target position 41 in the X direction together with the correction of the target line 40 in the Y direction in plan view is advantageous in positioning when the travel of the gantry crane 20 is stopped.

Although the control systems 30 of the third embodiment and the fourth embodiment are configured such that the parameter acquisition unit 37 calculates the inclination θt of the gantry crane 20 based on the position coordinates Pa, Pc obtained by the antennae 31$a$, 31$c$, the configuration is not limited to this. For example, the control systems 30 may include an inclinometer that directly measures the inclination θt of the gantry crane 20 instead of the antenna 31$c$ and the parameter acquisition unit 37. Note that the inclinometer is desirably installed on the girder member 22 of the gantry crane 20.

Figure 16:
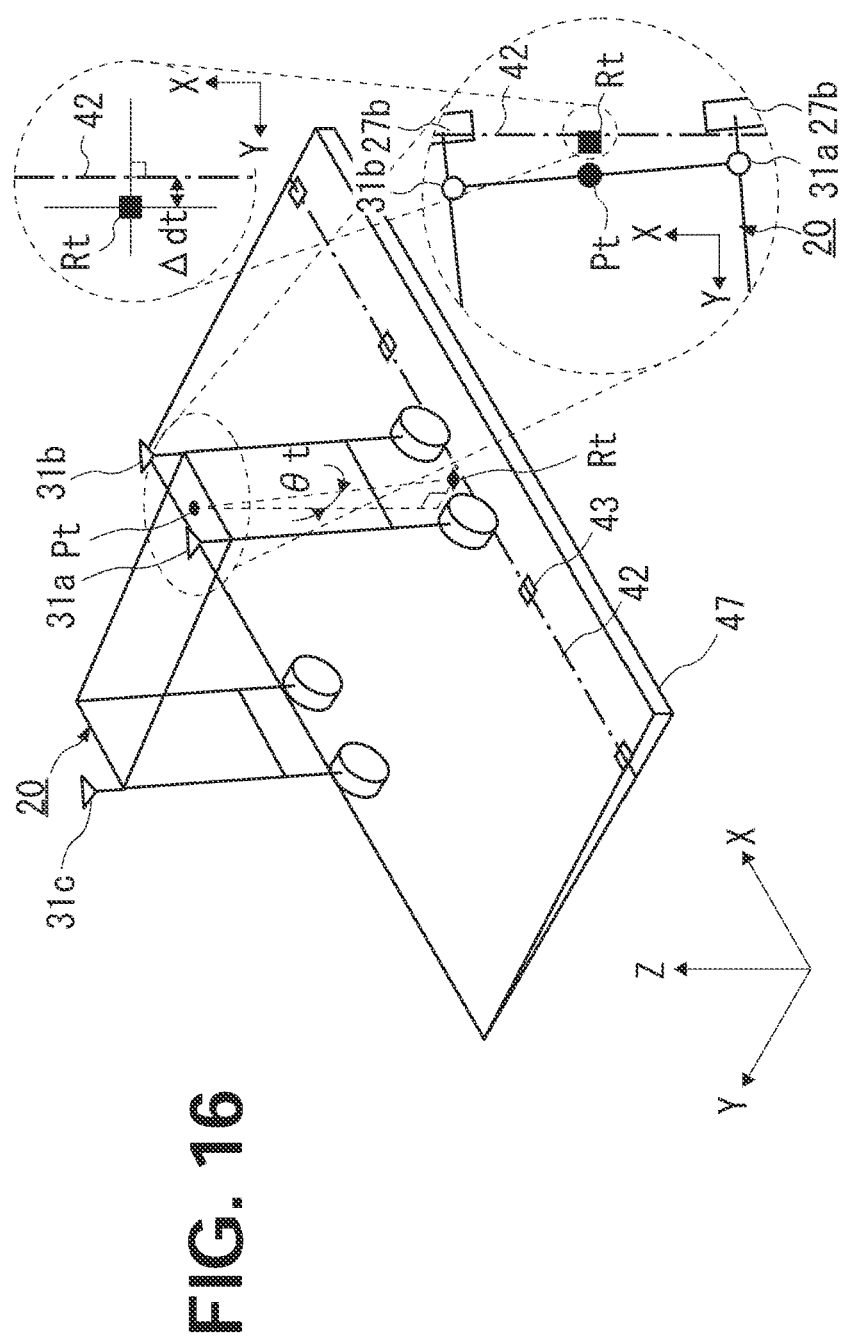
FIG. 16 is a perspective view illustrating a crane equipped with a fifth embodiment of the control system.
Figure 17:
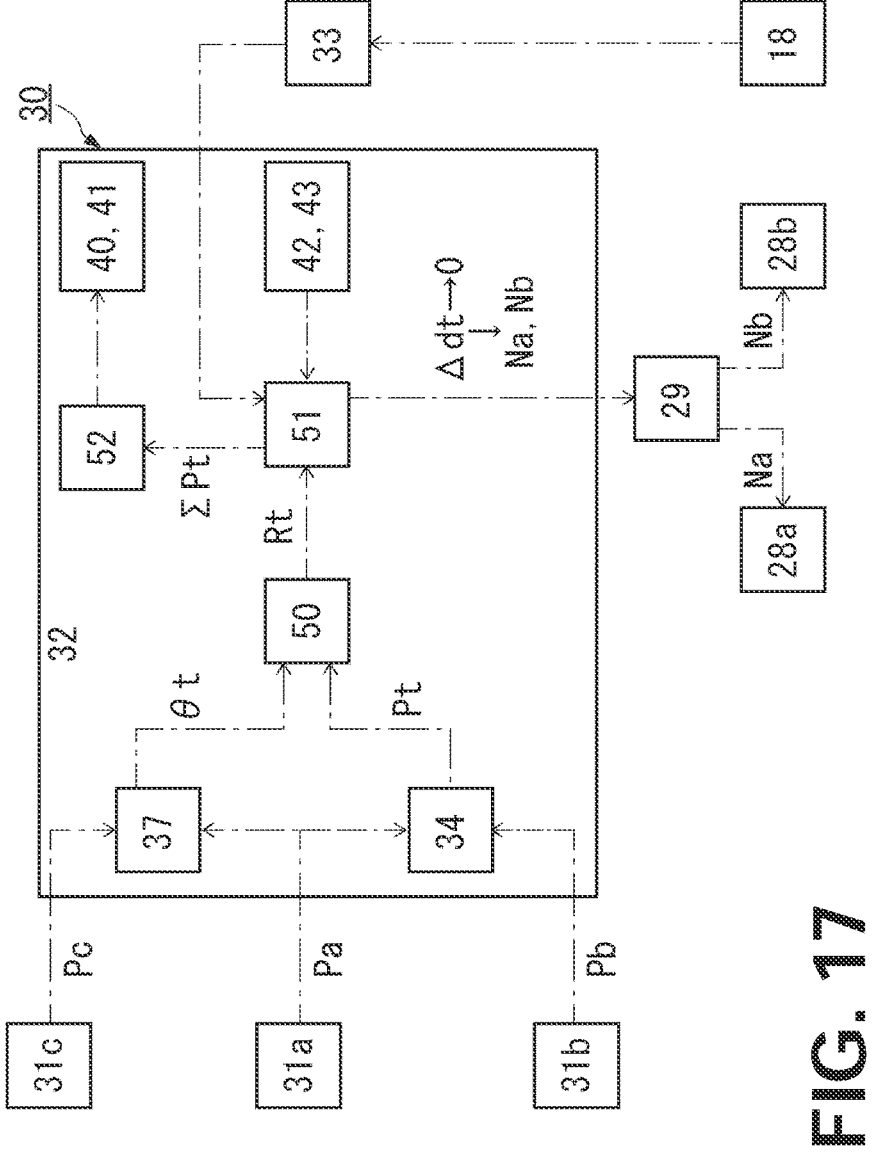
FIG. 17 is a block diagram illustrating the control system of FIG. 16.

As illustrated in FIG. 16 and FIG. 17, the control system 30 of a fifth embodiment is different from the aforementioned embodiments in that the control system 30 creates a target line 40. In the control system 30, the control device 32 includes a conversion position acquisition unit 50, a creation control unit 51, and a creation unit 52 as functional elements, and carries out control of creating a target line 40 after the creation control unit 51 carries out the control of making the gantry crane 20 travel based on a straight target line 42 stored in the internal storage unit in advance.

The conversion position acquisition unit 50 is a functional element that receives input of a current position Pt, which is acquired by the position acquisition unit 34, and an inclination et, which is acquired by the parameter acquisition unit 37, acquires a conversion position Rt of the gantry crane 20 for every predetermined cycle t, and outputs the acquired conversion position Rt to the creation control unit 51. The conversion position acquisition unit 50 desirably calculates the midpoint of position coordinates Pa, Pb as the current position Pt. Note that the position acquisition unit 34 may be a functional element that calculates the current position Pt based on the position coordinates Pa, Pb and the structural dimensions of the gantry crane 20.

The conversion position Rt is preferably a position of an end portion in the Y direction or a center portion in the Y direction of the structure 23 as a position (plane coordinates) at which the gantry crane 20 is currently present in plan view, in a reference horizontal plane 47, which is the horizontal plane in which the straight target line 42 is present. The conversion position Rt is a position obtained by displacing the current position Pt in the Y direction by a distance calculated with a trigonometric function using the height of the current position Pt based on the reference horizontal plane 47 and the inclination θt considering the spatial position coordinates of the straight target line 42 and the reference horizontal plane 47 as being known.

For example, in a case where the traveling gantry crane 20 is inclined to the left side in the Y direction at a position where the road surface 48 of the container storage yard 11 is inclined downward toward the left side in the Y direction, the conversion position Rt is located on the right side in the Y direction from the current position Pt in plan view. In addition, in a case where the traveling gantry crane 20 is not inclined at a position where the road surface 48 of the container storage yard 11 is horizontal, the conversion position Rt matches the current position Pt in plan view. In addition, in a case where the traveling gantry crane 20 is inclined to the right side in the Y direction at a position where the road surface 48 of the container storage yard 11 is inclined downward toward the right side in the Y direction, the conversion position Rt is located on the left side in the Y direction from the current position Pt in plan view.

The reference horizontal plane 47 is desirably set on the road surface 48 where no drainage slope is formed in the container storage yard 11. In addition, the reference horizontal plane 47 may be set in a horizontal plane having a height equal to an average value of heights of the road surface 48 in the container storage yard 11.

The creation control unit 51 is a functional element that receives input of the conversion position Rt outputted from the conversion position acquisition unit 50 and adjusts the rotation speeds Na, Nb of the electric motors 28$a$, 28$b$ through the inverter 29 based on a creation deviation ΔDt, which is a deviation between the conversion position Rt and the straight target line 42 stored in the internal storage unit in advance to adjust the respective travel speeds of the pair of travel devices 24$a$, 24$b$. The creation deviation ΔDt indicates an amount of deviation of the conversion position Rt relative to the straight target line 42 and indicates a distance between the conversion position Rt and a point of intersection of the straight target line 42 and a perpendicular that passes through the conversion position Rt and is orthogonal to the straight target line 42 in plan view. The creation deviation ΔDt is expressed with left deviation in the Y direction being positive and right deviation in the Y direction being negative in the drawing. In addition, the creation control unit 51 is also a functional element that sequentially stores the current position Pt when the conversion position Rt matches the stopping position 43 arranged on the straight target line 42 into the internal storage unit.

The creation unit 52 is a functional element that receives input of a plurality of current positions Pt stored by the creation control unit 51 into the internal storage unit and creates the target line 40 as a trace connecting the inputted plurality of current positions Pt in the order of travel. Note that in a case where the gantry crane 20 travels over a plurality of storage lanes 13, the plurality of current positions Pt stored in the internal storage unit are desirably stored while being divided for every storage lane 13.

Figure 18:
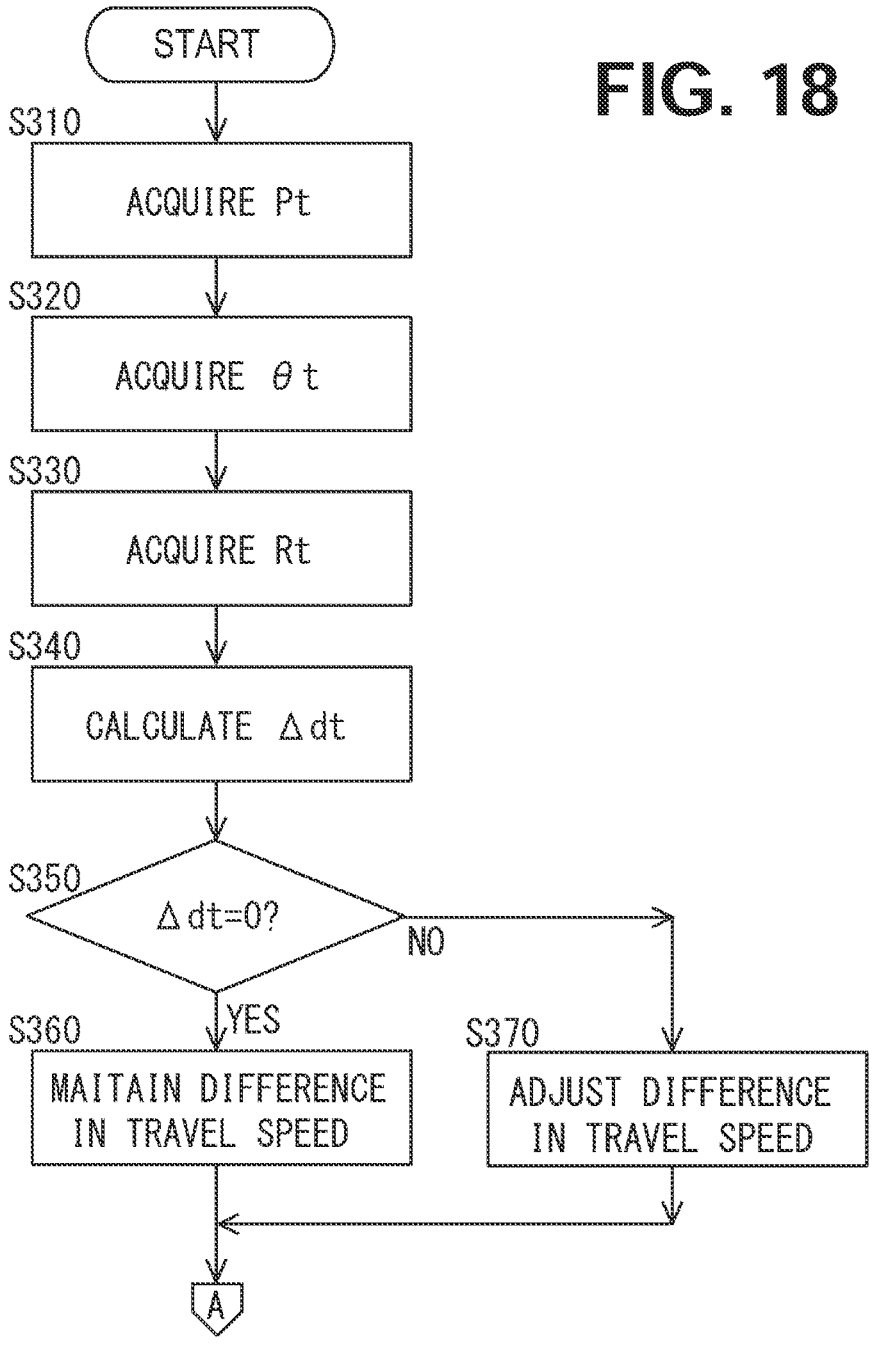
FIG. 18 is a part of a flowchart illustrating a fifth embodiment of the crane control method.
Figure 19:
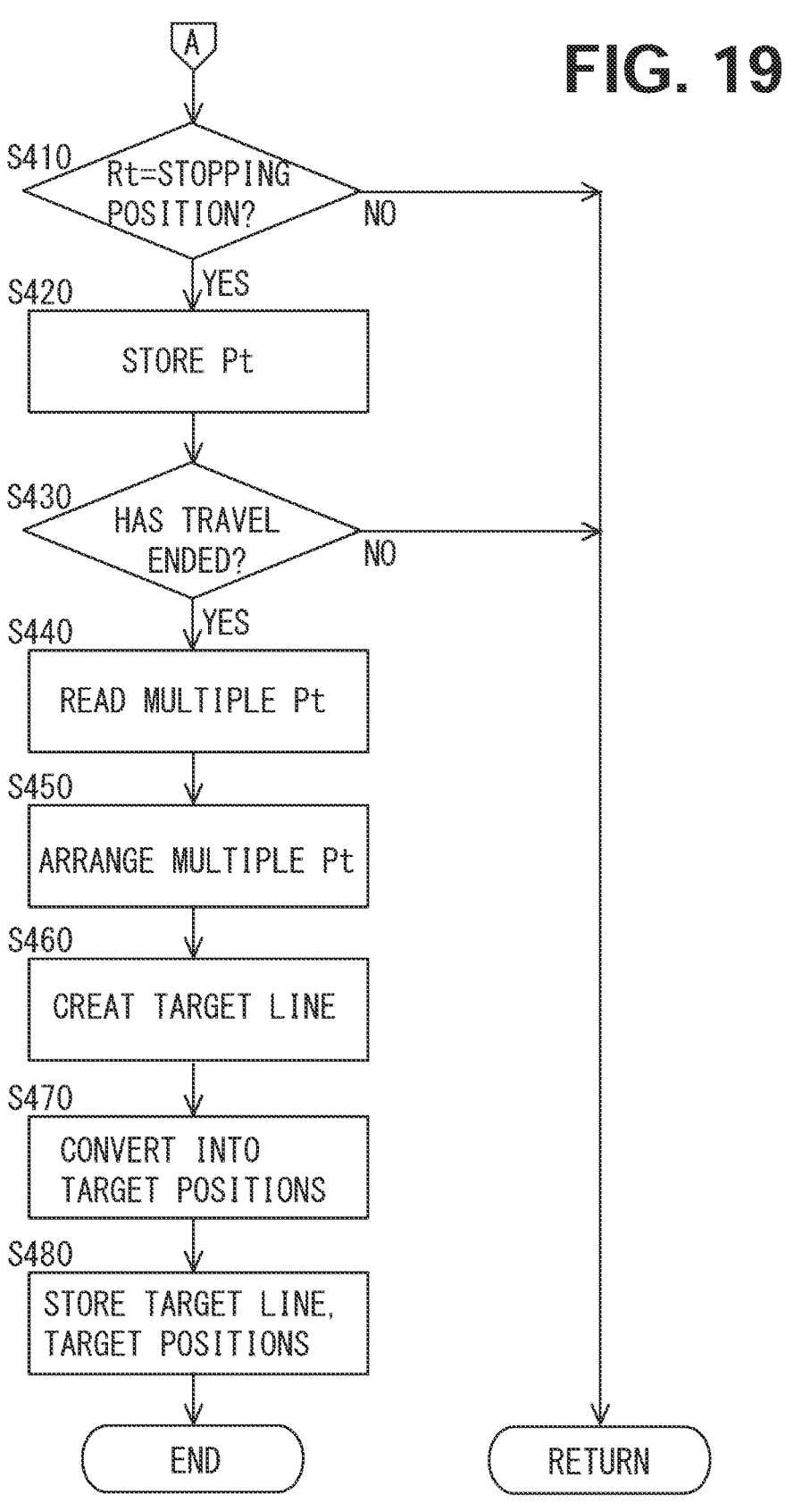
FIG. 19 is a flowchart following "A" in FIG. 18.

As illustrated in FIG. 18 and FIG. 19, the control method for the gantry crane 20 by the control system 30 of the fifth embodiment is a method including: making the communication instrument 33 receive creation instructions for a target line 40 from the upper system 18; and creating the target line 40 by making the gantry crane 20 travel based on the creation instructions. This control method is repeated for every predetermined cycle t while the gantry crane 20 is traveling, and ends once the traveling of the gantry crane 20 ends and the target line 40 is created. Note that in this control method, it is assumed that instructions to make the gantry crane 20 travel from one end to the opposite end of the storage lane 13 are set at the time of the start.

As illustrated in FIG. 18, after the start, the position acquisition unit 34 acquires the current position Pt of the gantry crane 20 (S310). Subsequently, the parameter acquisition unit 37 acquires the inclination θt of the gantry crane 20 (S320). Subsequently, the conversion position acquisition unit 50 acquires a conversion position Rt based on the acquired current position Pt and inclination θt (S330).

Subsequently, the creation control unit 51 calculates a creation deviation ΔDt based on the acquired conversion position Rt and the preset straight target line 42 (S340). Subsequently, the creation control unit 51 determines whether or not the calculated creation deviation ΔDt is zero (S350). If it is determined that the creation deviation ΔDt is zero (S350: YES), the creation control unit 51 maintains the difference in travel speed between the pair of travel devices 24a, 24b at the current difference in travel speed through the inverter 29 (S360), and the processing returns to the start. On the other hand, if it is determined that the creation deviation ΔDt is not zero (S350: NO), the creation control unit 51 adjusts the difference in travel speed between the pair of travel devices 24a, 24b to a difference in travel speed that makes the creation deviation ΔDt zero through the inverter 29 (S370), and the processing proceeds to A in FIG. 19.

As illustrated in FIG. 19, subsequently, the creation control unit 51 determines whether or not the acquired conversion position Rt matches the preset stopping position 43 (S410). If it is determined that the conversion position Rt does not match the stopping position 43 (S410: NO), the processing returns to the start. On the other hand, if it is determined that the conversion position Rt matches the stopping position 43 (S410: YES), the creation control unit 51 stores the current position Pt at the time of the match into the internal storage unit (S420). Subsequently, the creation control unit 51 determines whether or not the instructed travel has ended (S430). If it is determined that the travel has not ended (S430: NO), the processing returns to the start. On the other hand, if it is determined that the travel has ended (S430: YES), the processing proceeds the next step.

The creation unit 52 reads a plurality of current positions Pt stored in the internal storage unit (S440). Subsequently, the creation unit 52 arranges the plurality of current positions Pt in a predetermined plane or space (S450). This predetermined plane or space may be set as desired, and for example may be, for example, a plane that is parallel to the reference horizontal plane 47 and has a height set to the levels of the antennae 31a to 31c as the predetermined plane. Subsequently, the creation unit 52 forms a polygonal line by connecting the arranged plurality of current positions Pt in the order of travel of the gantry crane 20 with line segments to create the target line 40 (S460). Subsequently, the creation unit 52 converts the plurality of current positions Pt into target positions 41 (S470). Subsequently, the creation unit 52 stores the created target line 40 and target positions 41 into the internal storage unit (S480), and the processing ends.

As described above, when the gantry crane 20 is made to travel based on the straight target line 42, the control system 30 of the fifth embodiment creates the target line 40 as a trace drawn by the current positions Pt during the travel. For this reason, it is possible to reflect the inclination relative to the horizontal plane of the traveling gantry crane 20 in the target line 40. This makes it possible to carry out precise and high-speed travel control on the gantry crane 20 using the target line 40, making it possible to precisely and quickly position the gantry crane 20 at the target position.

It is preferable that the target line 40 be a trace obtained by connecting the current positions Pt of which the conversion positions Rt have matched any of the stopping positions 43 arranged on the straight target line 42 among the plurality of current positions Pt. The current positions Pt of which the conversion positions Rt have matched stopping positions 43 herein are target positions 41.

The control system 30 may be configured to carry out all of the travel control of one of the first embodiment or the second embodiment, the correction control of one of the third embodiment or the fourth embodiment, and the creation control of the fifth embodiment, or may be configured to carry out any of the controls. The control systems 30 installed in the plurality of gantry cranes 20 of the same type and the same model may be configured such that one of the control systems 30 carries out the correction control and the creation control.

All the gantry cranes 20 provided in the container terminal 10 may be configured to be controlled by all of the travel control, the correction control, and the creation control of the respective control systems 30 installed therein. In addition, the gantry cranes 20 may be configured such that all the gantry cranes 20 are controlled by two controls, that is, the travel control and the correction control of the respective control systems 30, and some gantry cranes 20 out of all the gantry cranes 20 are controlled by the creation control of the respective control systems 30. Moreover, the gantry cranes 20 may be configured such that all the gantry cranes 20 are controlled by the travel control of the respective control systems 30, and some of the gantry cranes 20 are controlled by the correction control and the creation control of the respective control systems 30.

In the container terminal 10, only at least one gantry crane 20 that is controlled by the correction control and the creation control of the control systems 30 has to be provided, and it is desirable that one gantry crane 20 is provided on each storage lane 13. Note that the gantry crane 20 that is controlled by the correction control and the creation control of the control system 30 may stand by in a place other than the storage lane 13 during cargo handling and arranged on the storage lane 13 only when being controlled by the creation control or the correction control.

The aforementioned target line 40 may be set in accordance with only the inclination of the road surface 48 to the horizontal plane among the inclinations of the gantry crane 20. That is, the target line 40 may be composed of a line that is bent in accordance with the inclination in the Y direction (angle about the X axis) among the inclinations of the road surface 48 on which the gantry crane 20 travels relative to the straight target line 42, which is a straight line extending in the direction of travel of the gantry crane 20 in the horizontal plane. For example, when the slope of the road surface 48 is known, the target line 40 may be set based on the known slope. In addition, the target line 40 may have a plurality of target positions 41 and be composed of a polygonal line that is bent at positions across which the slope of the road surface 48 changes among these target position 41 as inflection points.

Figure 20:
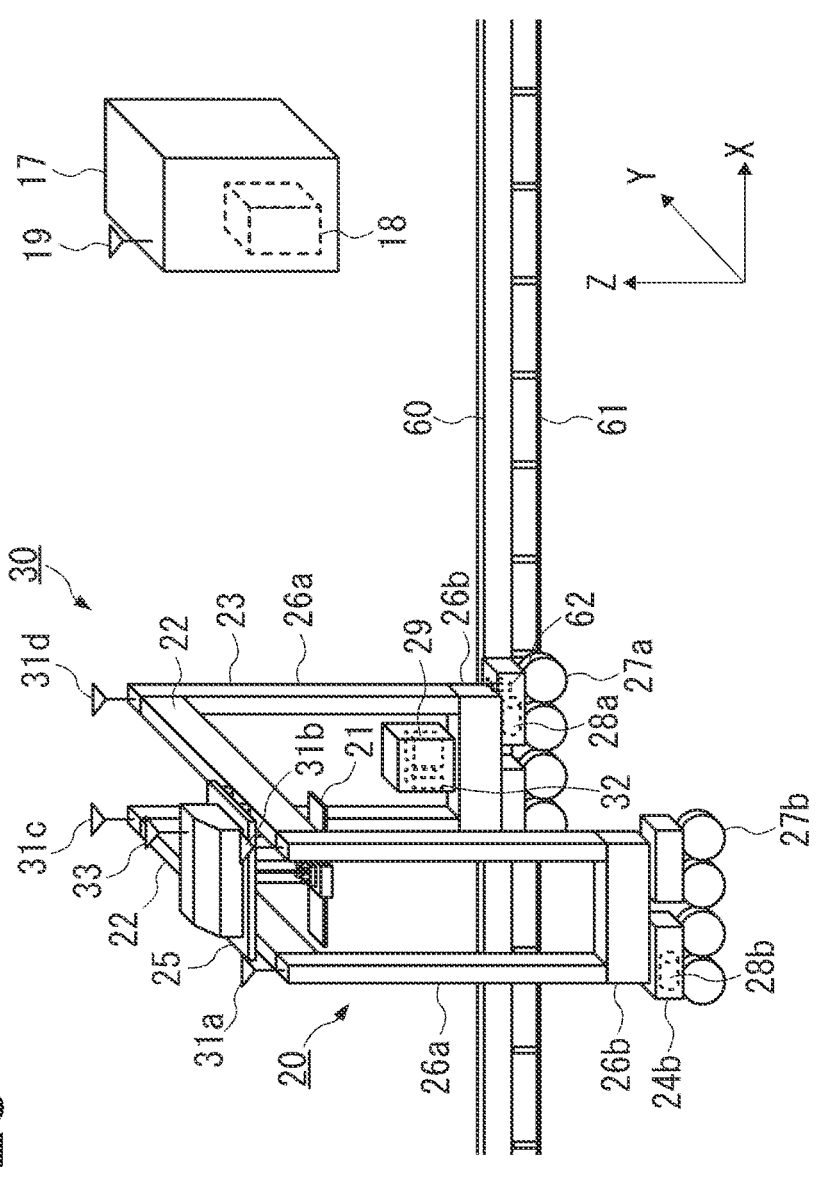
FIG. 20 is a perspective view illustrating a crane equipped with a sixth embodiment of the control system.
Figure 21:
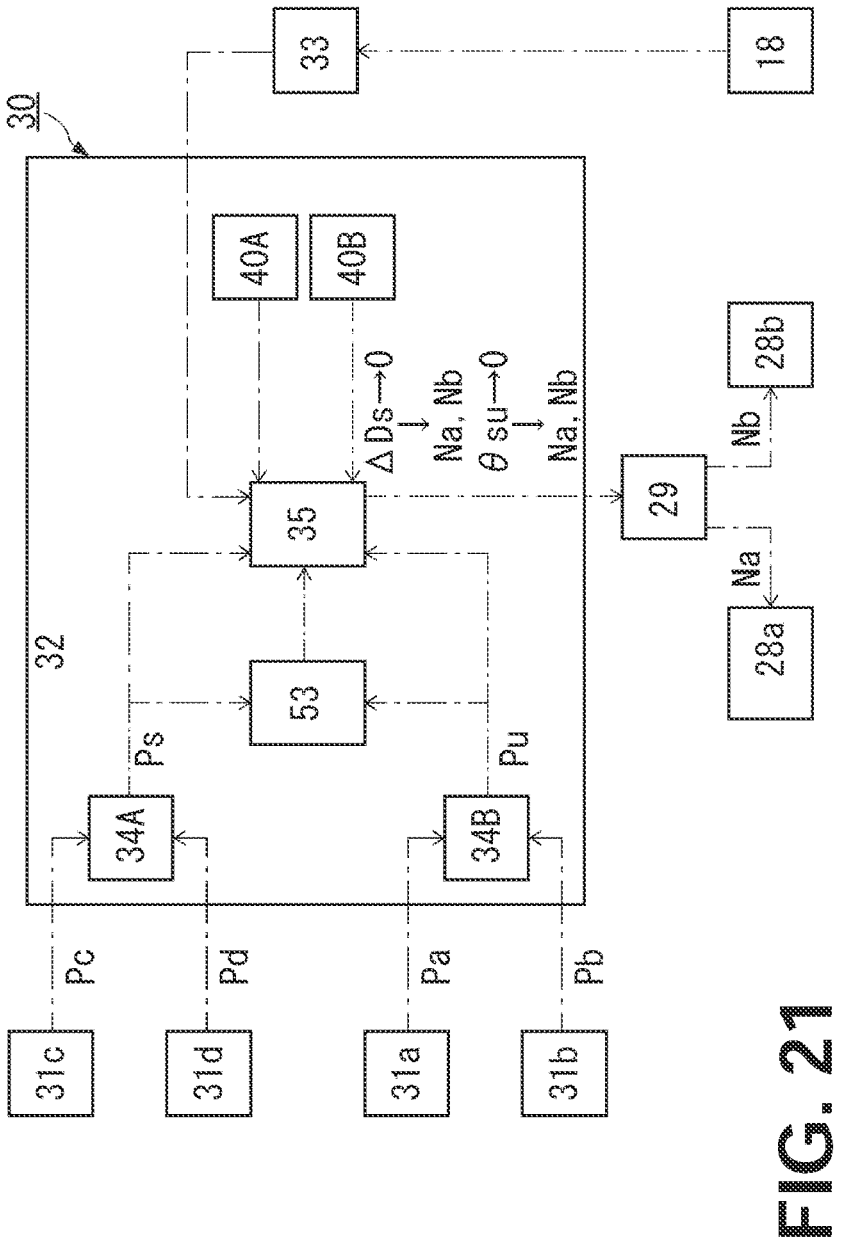
FIG. 21 is a block diagram illustrating the control system of FIG. 20.
Figure 22:
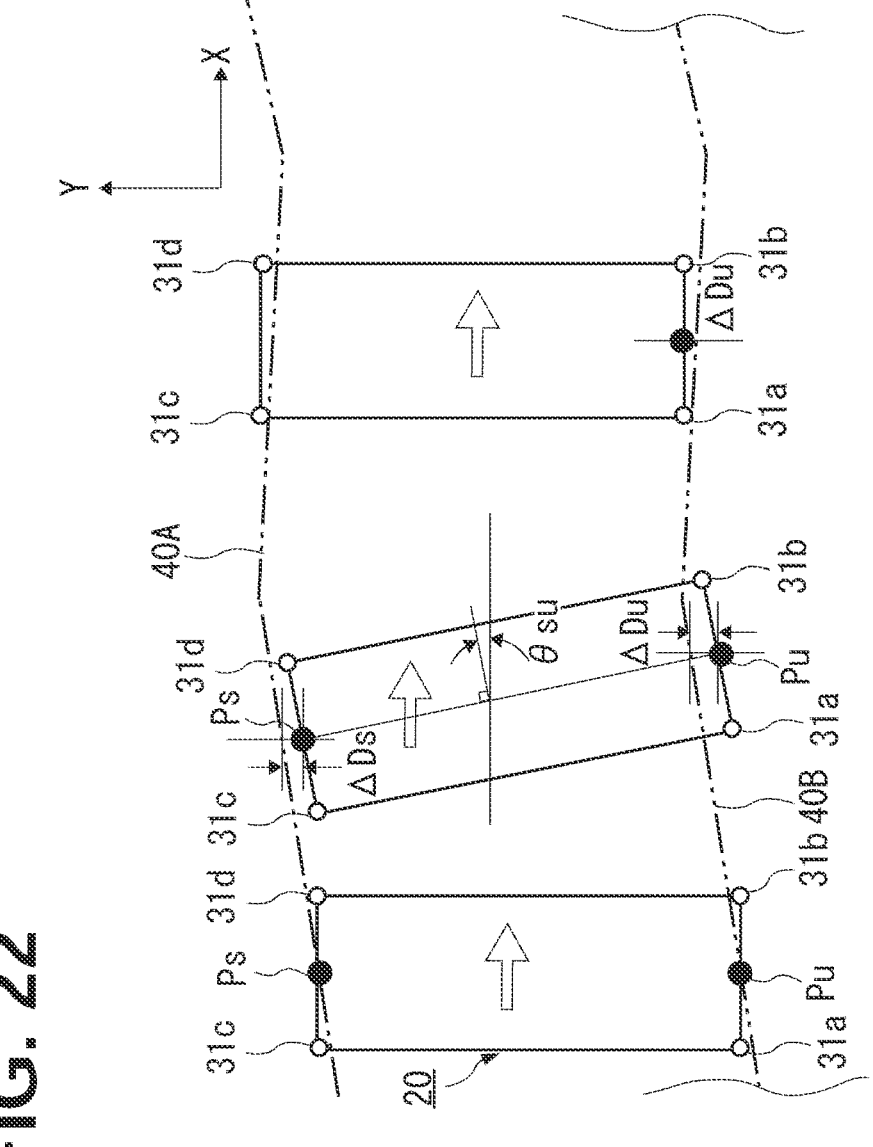
FIG. 22 is a plan view illustrating a main target line and an auxiliary target line of FIG. 21.

As illustrated in FIG. 20 to FIG. 22, the control system 30 of a sixth embodiment is different from the aforementioned embodiments in that the control system 30 has a plurality of target lines and a plurality of position acquisition units. At the side of one end portion in the Y direction of the gantry crane 20 of this embodiment, an external power supply device 60, which extends in the X direction, and a communication device 61, which extends in the X direction, are installed. The external power supply device 60 is a device that supplies electric power from outside to the gantry crane 20, and may be, for example, a busbar (conductor) and a power supply cable. The communication device 61 is a device that communicates with the control system 30 of the gantry crane 20 from outside, and may be, for example, a leaky coaxial cable or a power line that is capable of power line communication. The gantry crane 20 includes a power collection device 62 that is a device for receiving electric power from the external power supply device 60. The power collection device 62 may be, for example, a pantograph-type power collection device that comes into contact with a busbar to receive electric power and a cable reel around which a power supply cable is wound. It is preferable that in plan view, both of the external power supply device 60 and the communication device 61 be arranged at the side of one end portion in the Y direction of the gantry crane 20 and the power collection device 62 be installed in the one end portion.

The control system 30 includes antennae 31a, 31b, 31c, 31d. In addition, the control device 32 includes a main position acquisition unit 34A and an auxiliary position acquisition unit 34B instead of the position acquisition unit 34 of the aforementioned embodiments, includes a main target line 40A and an auxiliary target line 40B instead of the target line 40, and includes a target setting unit 53 as an additional functional element.

The antenna 31d is an antenna for the global navigation satellite system (GNSS) like the antennae 31a, 31b, 31c, and acquires position coordinates Pd composed of longitude, latitude, and altitude based on information of time and the like received from a plurality of satellites for every predetermined cycle t. The antenna 31d is arranged at the opposite end portion in the X direction of the structure 23 away from the antenna 31c in plan view. Note that in this embodiment, the antennae 31a, 31b, 31c, 31d are configured to be capable of acquiring longitude, latitude, and altitude as space coordinates (three-dimensional coordinates) utilizing the global navigation satellite system.

When the shape of the structure 23 of the gantry crane 20 in plan view is assumed to be substantially rectangular, the four antennae 31a to 31d are arranged at the four corner portions of the rectangle. Arranging the antennae 31a to 31d in this manner is advantageous in acquiring the inclination in the X direction and the inclination in the Y direction of the gantry crane 20.

The main position acquisition unit 34A is a functional element that acquires a predetermined position of an end portion on the side where the power collection device 62 is installed or an end portion on the side where the communication device 61 is arranged at the side among the end portions in the Y direction of the gantry crane 20 in plan view as a main current position Ps. Specifically, the main position acquisition unit 34A is a functional element that receives input of position coordinates Pc, Pd acquired by the antennae 31c, 31d, which are installed in the one end portion in the Y direction of the gantry crane 20 in plan view, for every predetermined cycle t, acquires the main current position Ps of the gantry crane 20 for every predetermined cycle t, and outputs the main current position Ps to the travel control unit 35 and the target setting unit 53. The main position acquisition unit 34A desirably calculates the midpoint of the position coordinates Pc, Pd as the main current position Ps.

The auxiliary position acquisition unit 34B is a functional element that acquires a predetermined position of an end portion different from the end portion on the side where the power collection device 62 is installed or the end portion on the side where the communication device 61 is arranged at the side among the end portions in the Y direction of the gantry crane 20 in plan view as an auxiliary current position Pu. Specifically, the auxiliary position acquisition unit 34B is a functional that receives input of position coordinates Pa, Pb acquired by the antennae 31a, 31b, which are installed in the opposite end portion in the Y direction of the gantry crane 20 in plan view, for every predetermined cycle t, acquires the auxiliary current position Pu of the gantry crane 20 for every predetermined cycle t, and outputs the auxiliary current position Pu to the travel control unit 35 and the target setting unit 53. The auxiliary position acquisition unit 34B desirably calculates the midpoint of the position coordinates Pa, Pb as the auxiliary current position Pu.

The main current position Ps indicates the position at which the gantry crane 20 is currently present in plan view, and more specifically indicates the position at which the one end portion in the Y direction of the gantry crane 20 is currently present. The main current position Ps preferably indicates the position of the midpoint of the position coordinates Pc, Pd in plan view. The auxiliary current position Pu indicates the position at which the gantry crane 20 is currently present in plan view, and more specifically indicates the position at which the opposite end portion in the Y direction of the gantry crane 20 is currently present. The auxiliary current position Pu preferably indicates the position of the midpoint of the position coordinates Pa, Pb in plan view.

The main target line 40A has the same configuration and creation method as those of the target line 40 of the aforementioned embodiments, but is different from the target line 40 in that the position to arrange the main target line 40A is fixed. The main target line 40A is composed of a line that is arranged on the one end portion side in the Y direction of the gantry crane 20 in plan view, extends in the X direction, and is bent in the Y direction in accordance with the inclination in the Y direction of the gantry crane 20.

The auxiliary target line 40B is duplicated from the main target line 40A and is arranged away from the main target line 40A in the Y direction. Specifically, the auxiliary target line 40B is composed of a line that is arranged on the opposite end portion side in the Y direction of the gantry crane 20 in plan view, extends in the X direction, and is bent in the Y direction in accordance with the inclination in the Y direction of the gantry crane 20 like the main target line 40A.

The target setting unit 53 is a functional element that receives input of the main current position Ps outputted from the main position acquisition unit 34A and the auxiliary current position Pu outputted from the auxiliary position acquisition unit 34B and outputs instructions to set the current position and the target line, which are used by the travel control unit 35, based on the input. Specifically, when the main current position Ps is inputted, the target setting unit 53 makes the travel control unit 35 switch to use the main current position Ps as the current position and the main target line 40A as the target line. In addition, when the main current position Ps is not inputted and the auxiliary current position Pu is inputted, the target setting unit 53 makes the travel control unit 35 switch to use the auxiliary current position Pu as the current position and the auxiliary target line 40B as the target line.

The travel control unit 35 is a functional element that sets the current position and the target line to be used for travel control based on the instructions from the target setting unit 53 and adjusts the rotation speeds Na, Nb of the electric motors 28a, 28b through the inverter 29 based on the deviation of these to adjust the respective travel speeds of the pair of travel devices 24a, 24b. Specifically, the travel control unit 35 adjusts the respective travel speeds of the pair of travel devices 24a, 24b based on the main travel deviation ΔDs between the main current position Ps and the main target line 40A, or adjusts the respective travel speeds of the pair of travel devices 24a, 24b based on the auxiliary travel deviation ΔDu between the auxiliary current position Pu and the auxiliary target line 40B, or stop the travel when both of the main current position Ps and the auxiliary current position Pu are not inputted. The main travel deviation ΔDs and the auxiliary travel deviation ΔDu indicate the amount of deviation of the current position from the target line in plan view like the above-described travel deviation ΔDt.

In addition, the travel control unit 35 is also a functional element that, in a case where the main travel deviation ΔDs and the auxiliary travel deviation ΔDu are different, determines the attitude of the gantry crane 20 in plan view and corrects the respective travel speeds of the pair of travel devices 24a, 24b. Specifically, in a case where the main travel deviation ΔDs and the auxiliary travel deviation ΔDu are different, the travel control unit 35 calculates an attitude angle θsu. The attitude angle θsu is an amount of attitude deviation of the gantry crane 20 in plan view, and is an angle made by the X direction and a normal to a line segment connecting the main current position Ps and the auxiliary current position Pu with reference to the X direction. The attitude angle θsu is not limited to the angle made by the X direction and the normal to the line segment connecting the main current position Ps and the auxiliary current position Pu. For example, the attitude angle θsu may be calculated as an angle made by the Y direction and the line segment connecting the main current position Ps and the auxiliary current position Pu with reference to the Y direction in plan view. Alternatively, the attitude angle θsu may be calculated using a conversion table in which the attitude angle θsu is set in accordance with the main travel deviation ΔDs and the auxiliary travel deviation ΔDu or a conversion table in which the attitude angle θsu is set in accordance with a difference between the main travel deviation ΔDs and the auxiliary travel deviation ΔDu.

As illustrated in FIG. 22, the gantry crane 20 in the left end in the drawing is in a state where the main current position Ps has been acquired, and hence the respective travel speeds of the pair of travel devices 24a, 24b are adjusted based on the main travel deviation ΔDs. The gantry crane 20 in the right end in the drawing is in a state where the main current position Ps has not been acquired and only the auxiliary current position Pu has been acquired. For this reason, for this gantry crane 20, the respective travel speeds of the pair of travel devices 24a, 24b are adjusted based on the auxiliary travel deviation ΔDu. The gantry crane 20 in the center in the drawing is in a state where the main travel deviation ΔDs and the auxiliary travel deviation ΔDu are different, and hence the respective travel speeds of the pair of travel devices 24a, 24b are adjusted based on the main travel deviation ΔDs. In addition, for this gantry crane 20, the attitude angle θsu of the gantry crane 20 in plan view is determined, and the difference in travel speed is corrected such that the attitude angle θsu becomes zero.

Figure 23:
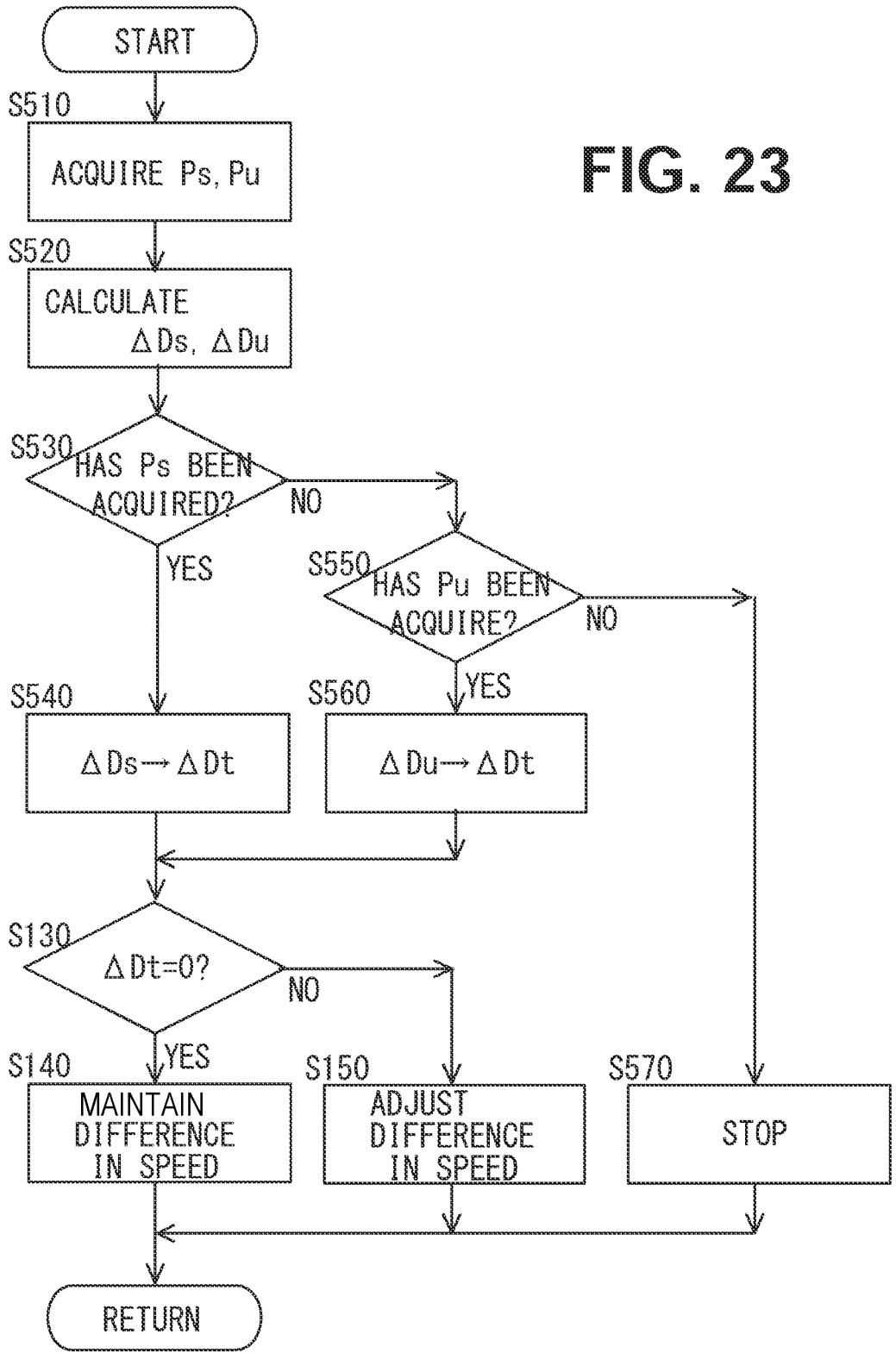
FIG. 23 is a flowchart illustrating a sixth embodiment of the crane control method.

As illustrated in FIG. 23, the control method for the gantry crane 20 of the sixth embodiment is a method including: making the communication instrument 33 receive cargo-handling instructions from the upper system 18, and making the gantry crane 20 travel based on the cargo-handling instructions. This control method is repeated for every predetermined cycle t while the gantry crane 20 is being made to travel. Note that in the control method of the present disclosure, it is assumed that the position serving as the stopping target position of the gantry crane 20 is set at the time of start, and the gantry crane 20 is ended once the gantry crane 20 is stopped at the position serving as the stopping target position.

After the start, the antennae 31a to 31d acquire the position coordinates Pa to Pd, the main position acquisition unit 34A acquires the main current position Ps based on the position coordinates Pc, Pd, and the auxiliary position acquisition unit 34B acquires the auxiliary current position Pu based on the position coordinates Pa, Pb (S510).

Subsequently, the travel control unit 35 calculates the main travel deviation ΔDs, which is a difference between the main current position Ps and the main target line 40A, and the auxiliary travel deviation ΔDu, which is a difference between the auxiliary current position Pu and the auxiliary target line 40B (S520). Note that it is assumed that in a case where the main current position Ps has not been acquired in step S510, the main travel deviation ΔDs is not calculated in this step, and in a case where the auxiliary current position Pu has not been acquired, the auxiliary travel deviation ΔDu is not calculated in this step.

Subsequently, the target setting unit 53 determines whether or not the main current position Ps has been acquired in step S510 (S530). If it is determined that the main current position Ps has been acquired (S530: YES), the target setting unit 53 outputs instructions to the travel control unit 35 to set the current position to the main current position Ps, the target line to the main target line 40A, and the deviation to the main travel deviation ΔDs (S540).

On the other hand, if it is determined that the main current position Ps has not been acquired (S530: NO), the target setting unit 53 determines whether or not the auxiliary current position Pu has been acquired in step S510 (S550). If it is determined that the auxiliary current position Pu has been acquired (S550: YES), the target setting unit 53 outputs instructions to the travel control unit 35 to set the current position to the auxiliary current position Pu, the target line to the auxiliary target line 40B, and the deviation to the auxiliary travel deviation ΔDu (S560).

On the other hand, if it is determined that the auxiliary current position Pu has not been acquired (S550: NO), the travel control unit 35 stops the pair of travel devices 24a, 24b through the inverter 29 (S570), and the processing returns to the start.

In a case where the main current position Ps or the auxiliary current position Pu has been acquired, the travel control unit 35 determines whether or not the deviation is zero like in the first embodiment (S130). If it is determined that the deviation is zero (S130: YES), the travel control unit 35 maintains the difference in travel speed between the pair of travel devices 24a, 24b to the current difference in travel speed through the inverter 29 (S140), and the processing returns to the start. On the other hand, if it is determined that the deviation is not zero (S150: NO), the travel control unit 35 adjusts the difference in travel speed between the pair of travel devices 24a, 24b to a difference in travel speed that makes the deviation zero through the inverter 29 (S150), and the processing returns to the start.

As illustrated in FIG. 24, when the main travel deviation ΔDs and the auxiliary travel deviation ΔDu have been calculated in step S520 in FIG. 23, the travel control unit 35 determines whether or not the main travel deviation ΔDs and the auxiliary travel deviation ΔDu are equal (S610). In this step S610, an allowable range may be set in determining whether or not the main travel deviation ΔDs and the auxiliary travel deviation ΔDu are equal, and it may be determined that the main travel deviation ΔDs and the auxiliary travel deviation ΔDu are equal if the absolute value of the deviation between the main travel deviation ΔDs and the auxiliary travel deviation ΔDu is equal to or less than a threshold. If it is determined that the main travel deviation ΔDs and the auxiliary travel deviation ΔDu are equal (S610: YES), the travel control unit 35 maintains the current difference in travel speed (S620), and the processing returns to the start.

On the other hand, if it is determined that the main travel deviation ΔDs and the auxiliary travel deviation ΔDu are not equal (S610: NO), the travel control unit 35 calculates the attitude angle θsu (S630). Subsequently, the travel control unit 35 corrects the current difference in travel speed to a difference in travel speed that makes the attitude angle θsu zero (S640), and the processing returns to the start.

As described above, the control system 30 of the gantry crane 20 of the sixth embodiment includes a plurality of target lines, that is, the main target line 40A and the auxiliary target line 40B, and a plurality of position acquisition units, that is, the main position acquisition unit 34A and the auxiliary position acquisition unit 34B. That is, even when the main position acquisition unit 34A cannot acquire the main current position Ps, in a case where the auxiliary position acquisition unit 34B can acquire the auxiliary current position Pu, it is possible to make the gantry crane 20 travel without stopping the travel based on the auxiliary travel deviation ΔDu, which is the deviation between the auxiliary current position Pu and the auxiliary target line 40B. This is advantageous in reducing the frequency of stopping the travel, making it possible to carry out a precise and high-speed control of making the gantry crane 20 travel and to precisely and quickly position the gantry crane 20 at the target position 41.

In the travel control on the gantry crane 20, the respective travel speeds of the pair of travel devices 24a, 24b are adjusted based on the deviation between the current position of the gantry crane 20 and the target. For this reason, in a case where the current position of the gantry crane 20 cannot be grasped, it is necessary to stop the travel in consideration of the safety. The state where the current position of the gantry crane 20 cannot be grasped, that is, the state where the main current position Ps or the auxiliary current position Pu cannot be acquired may be, for example, a situation where the number of satellites caught by the antennae 31a to 31d has significantly decreased, a situation where the antennae 31a to 31d receives jamming, a situation where t the antennae 31a to 31d receives an effect of multiple-wave propagation (also referred to as multipath), and a situation where the antennae 31a to 31d receives an electrical noise from a gantry crane 20. In addition, such state may also be, for example, a situation where the antennae 31a to 31d cannot receive a correction signal in RTK measurement.

In this regard, the control system 30 of the sixth embodiment can continue the cargo handling operation without stopping the travel of the gantry crane 20 if the control system 30 can acquire at least one of the main current position Ps or the auxiliary current position Pu. This is advantageous in reducing downtime.

In a case where power is supplied from the external power supply device 60 using the power collection device 62, or in a case where communications are made using the communication device 61, as in the gantry crane 20 of the sixth embodiment, even if the deviation between the current position of the gantry crane 20 and the target line were maintained constant, the interval between the external power supply device 60 and the power collection device 62 or the distance to the communication device 61 could change depending on the attitude of the gantry crane 20. This change in interval or distance becomes a cause of a higher frequency of mobility of the power collection device 62, or a higher frequency of overloading on the external power supply device 60 or the power collection device 62, or a higher frequency of communication disruption.

In this regard, the control system 30 of the sixth embodiment can keep the interval between the external power supply device 60 and the power collection device 62 and the distance to the communication device 61 within a certain range without causing excessive deviation from the target if the control system 30 can acquire at least one of the main current position Ps or the auxiliary current position Pu. This is advantageous in improving the durability of the external power supply device 60 and the power collection device 62 and makes it possible to reduce the frequency of inspecting and replacing these. In addition, this is advantageous in reducing the frequency of communication disruption and makes it possible to reduce downtime due to communication disruption.

In addition, it is desirable for the control system 30 of the present embodiment that a predetermined position of the end portion in the Y direction on the side where the external power supply device 60 and the communication device 61 are arranged at the side is the main current position Ps. This is advantageous in keeping the interval between the external power supply device 60 and the power collection device 62 and the distance to the communication device 61 within a certain range since the travel of the gantry crane 20 is controlled, starting from the end portion in the Y direction on the side where the external power supply device 60 and the communication device 61 are arranged at the side.

For example, when the gantry crane 20 is attempted to be stopped such that the attitude angle θsu becomes zero immediately before the gantry crane 20 is stopped at a desired target position 41, there can be a case where one of the pair of travel devices 24a, 24b is stopped and the other is driven. such a time difference in stop timing between the pair of travel devices 24*a*, 24*b* possibly causes distortion in the gantry crane 20. With distortion having occurred in the gantry crane 20, even when the current position acquired using the antennae 31*a* to 31*d* at the time of stopping the gantry crane 20 and the target position 41 match, the gantry crane 20 actually stops with displacement due to the distortion.

In this regard, in a case where the main travel deviation ΔDs and the auxiliary travel deviation ΔDu are different, the control system 30 of the present embodiment determines the attitude of the gantry crane 20 in plan view. For this reason, it is possible to correct the attitude of the gantry crane 20 during travel earlier than immediately before the gantry crane 20 stops the desired target position 41. That is, it is possible to make the gantry crane 20 travel without changing the attitude in plan view as much as possible. This eliminates the time difference in stop timing between the pair of travel devices 24*a*, 24*b* and is thus advantageous in stopping the gantry crane 20 without causing distortion in the gantry crane 20, making it possible to precisely stop the gantry crane 20 at the desired target position 41.

Although in the sixth embodiment, an example in which the external power supply device 60 and the communication device 61 are arranged at the side of one end portion in the Y direction of the gantry crane 20 has been described. it is also possible to employ a configuration in which only the external power supply device 60 is arranged at the side of one end portion in the Y direction of the gantry crane 20 and a configuration in which only the communication device 61 is arranged. In addition, in a case where the external power supply device 60 is arranged at the side of end portion in the Y direction of the gantry crane 20 while the communication device 61 is arranged at the side of the opposite end portion, an end portion on the side where displacement is larger may be selectively set as the main current position Ps through experiments or tests in advance.

Although in the sixth embodiment, two target lines, that is, the main target line 40A and the auxiliary target line 40B have been described as an example, the number of target lines is not limited to two, but may be three or more. For example, a center target line that is arranged in the middle between the main target line 40A and the auxiliary target line 40B may be additionally provided.

Although in the sixth embodiment, an example in which the main current position Ps is acquired using two antennae 31*c*, 31*d* and the auxiliary current position Pu is acquired using two antennae 31*a*, 31*b* has been described, it is also possible to acquire the main current position Ps using only the antenna 31*c* and acquire the auxiliary current position Pu using only the antenna 31*a*.

The control system 30 of the sixth embodiment may set the target region 44 in the second embodiment for each of the main target line 40A and the auxiliary target line 40B. It is possible to make the control system 30 set a second main target line and a second auxiliary target line using these target regions 44 and make the travel control unit 35 use the second main target line and the second auxiliary target line instead of the main target line 40A and the auxiliary target line 40B. In addition, the control system 30 of the sixth embodiment may correct the main target line 40A and the auxiliary target line 40B in the same method as in the third embodiment or the fourth embodiment.

EXPLANATION OF REFERENCE NUMERALS

20 gantry crane
22 girder member

23 structure
24*a*, 24*b* travel device
30 control system
34 position acquisition unit
34A main position acquisition unit
34B auxiliary position acquisition unit
35 control unit
40 target line
40A main target line
40B auxiliary target line
Pt current position
Ps main current position
Pu auxiliary current position
ΔDt travel deviation
ΔDs main travel deviation
ΔDu auxiliary travel deviation

The invention claimed is:

1. A crane control system comprising:

a position acquisition unit that successively acquires a current position of a crane having a pair of travel devices that are arranged away from each other in a direction of extension of a girder member arranged in an upper portion of a structure and are attached to a lower end of the structure; and a travel control unit that is connected to the position acquisition unit and each of the pair of travel devices, characterized in that the position acquisition unit is installed in an upper portion of the structure, the current position acquired by the position acquisition unit indicates a predetermined position in an upper position of the structure in plan view, the crane control system includes a target line that is bent in the direction orthogonal to the direction of extension of a straight target line in accordance with an inclination relative to a horizontal plane of a road surface on which the crane travels among inclinations of the crane in a case where the crane is made to travel based on the straight target line forming a straight line, using a height of a road surface on which the crane travels as a reference, extending in the direction of travel of the crane in plan view, and the travel control unit carries out a control of making the crane travel by adjusting respective travel speeds of the pair of travel devices based on a travel deviation between the target line and the current position acquired by the position acquisition unit using the target line as a target for the current position.

2. The crane control system according to claim 1, wherein the position acquisition unit includes:

a main position acquisition unit that successively acquires a main current position as the current position; and an auxiliary position acquisition unit that successively acquires an auxiliary current position as the current position, the target line includes:

a main target line; and an auxiliary target line, in a case where the main position acquisition unit has acquired the main current position, the travel control unit carries out the control of making the crane travel by adjusting the respective travel speeds of the pair of travel devices based on a main travel deviation between the main target line and the main current position, and in a case where the main position acquisition unit cannot acquire the main current position, the travel control unit carries out the control of making the crane travel by adjusting the respective travel speeds of the pair of travel devices based on an auxiliary travel deviation between the auxiliary target line and the auxiliary current position acquired by the auxiliary position acquisition unit.

3. The crane control system according to claim 2, wherein in plan view, a power collection device that is connected to an external power supply device for supplying electric power from outside to the crane is arranged in one end portion in the direction of extension of the crane, or a communication device that communicates with the crane is arranged at a side of the one end portion in the direction of extension of the crane, the main current position is present in the one end portion, and the auxiliary current position is present in an opposite end portion in the direction of extension.

4. The crane control system according to claim 2, wherein in a case where the main position acquisition unit cannot acquire the main current position and the auxiliary position acquisition unit cannot acquire the auxiliary current position, the travel control unit carries out a control of stopping the pair of travel devices to stop the crane.

5. The crane control system according to claim 1, wherein in a case where the main travel deviation and the auxiliary travel deviation are different, the travel control unit determines an attitude of the crane in plan view.

6. The crane control system according to claim 1, wherein the target line has a plurality of target positions thereon and is composed of a polygonal line that is bent at a target position where the inclination of the crane changes before and after the target position as an inflection point among the target positions in plan view.

7. The crane control system according to claim 1, wherein the target line is a trace connecting a plurality of current positions obtained during travel in which any one crane of the crane and a different crane of the same type and the same model as those of the crane is made to travel based on a creation deviation between a straight target line that extends in the direction of travel and forms a straight line in plan view and a conversion position obtained by converting a current position acquired by the position acquisition unit into a position on a reference horizontal plane on which the straight target line is present.

8. The crane control system according to claim 7, wherein the straight target line has a plurality of stopping positions at every predetermined distance thereon, the target line is a trace connecting current positions for each of which the conversion position and the stopping position match among a plurality of current positions acquired during the travel.

9. The crane control system according to claim 8, wherein the structure straddles a storage lane in which a plurality of containers are stored, in the direction of extension, the straight target line is a line that extends straight in a longitudinal direction of the storage lane, the stopping position is set for each bay that is an arrangement position for a container in the longitudinal direction of the storage lane.

10. The crane control system according to claim 8, wherein the target line has a plurality of target positions thereon, and the target positions are positions each shifted to front or back in the direction of travel in accordance with an inclination in the direction of travel and shifted to right or left in the direction of extension in accordance with an inclination in the direction of extension among inclinations of the crane during travel relative to the stopping position in plan view.

11. The crane control system according to claim 1, comprising:

a target region that extends from the target line to both sides in the direction of extension with a predetermined width, wherein the travel control is a control using a second target line instead of the target line, the control unit carries out a control of setting the second target line for a path different from a path that follows the target line from a control starting point to a control ending point in the travel control within a range covered by the target region.

12. The crane control system according to claim 1, comprising:

a parameter acquisition unit that acquires a parameter that changes depending on an inclination in the direction of extension of the crane;

a correction unit that is connected to the parameter acquisition unit and the position acquisition unit; and a reference value obtained when the current position matches a correction position arranged on the target line, wherein in a case where the current position matches the correction position, the correction unit carries out a correction control on the target line based on a correction deviation between the parameter acquired by the parameter acquisition unit and the reference value.

13. A crane control method including:

successively acquiring a current position of a crane having a pair of travel devices that are arranged away from each other in a direction of extension of a girder member arranged in an upper portion of a structure and are attached to a lower end of the structure, the current position of the crane being based on a position acquisition unit installed in the upper portion of the structure, the current position of the crane indicates a predetermined position in the upper portion of the structure in plan view; and making the crane travel by adjusting respective travel speeds of the pair of travel devices based on the acquired current position, characterized in that the crane control method comprises:

setting a target line that is bent in the direction orthogonal to the direction of extension of a straight target line in accordance with an inclination relative to a horizontal plane of a road surface on which the crane travels among inclinations of the crane in a case where the crane is made to travel based on the straight target line forming a straight line, using a height of a road surface on which the crane travels as a reference, extending in the direction of travel of the crane in plan view, before the travel of the crane; and making the crane travel by adjusting respective travel speeds of the pair of travel devices based on a travel deviation between the set target line and the acquired current position during travel of the crane using the target line as a target for the current position.

14. The crane control method according to claim 13, comprising:

making any one of the crane or a different crane of the same type and the same model as those of the crane travel based on a creation deviation between a straight target line that extends in the direction of travel and forms a straight line in plan view and a conversion position obtained by converting the acquired current position into a position on a reference horizontal plane on which the straight target line is present, and storing a plurality of the current positions acquired during the travel; and creating the target line from a trace connecting the stored plurality of current positions.

15. The crane control method according to claim 13, comprising:

successively acquiring a main current position and an auxiliary current position as the current positions;

setting a main target line and an auxiliary target line as the target lines;

in a case where the main current position has been acquired during travel of the crane, making the crane travel by adjusting respective travel speeds of the pair of travel devices based on a main travel deviation between the set main target line and the acquired main current position, while in a case where the main current position cannot be acquired, making the crane travel by adjusting the respective travel speeds of the pair of travel devices based on an auxiliary travel deviation between the set auxiliary target line and the acquired auxiliary current position.

16. The crane control method according to claim 15, comprising:

making any one of the crane or a different crane of the same type and the same model as those of the crane travel based on a creation deviation between a straight target line that extends in the direction of travel and forms a straight line in plan view and a conversion position obtained by converting the acquired main current position into a position on a reference horizontal plane on which the straight target line is present, and storing a plurality of the main current positions acquired during the travel; and creating the target line from a trace connecting the stored plurality of main current positions, creating the auxiliary target line duplicated from the created main target line, and arranging the main target line on one end portion side in the direction of extension of the crane and the auxiliary target line on an opposite end portion side in the direction of extension of the crane in plan view.

* * * * *